United States Patent

Kashiwazaki et al.

[11] Patent Number: 5,931,586
[45] Date of Patent: Aug. 3, 1999

[54] APPARATUS CAPABLE OF COMBINING INPUTS FROM TWO DIFFERENT PRINTER LANGUAGES

[75] Inventors: Masami Kashiwazaki, Kawasaki; Yoichi Toyokura, Yokohama; Osamu Hosoda, Inagi; Takuto Harada, Koshigaya; Masamichi Akashi, Yokohama, all of Japan

[73] Assignee: Canon Kabushiki Kaisha, Tokyo, Japan

[21] Appl. No.: 08/968,925

[22] Filed: Nov. 6, 1997

Related U.S. Application Data

[63] Continuation of application No. 08/489,781, Jun. 13, 1995, abandoned, which is a continuation of application No. 08/063,262, May 17, 1993, abandoned.

[30] Foreign Application Priority Data

May 18, 1992 [JP] Japan .................................. 4-125133
May 18, 1992 [JP] Japan .................................. 4-125135

[51] Int. Cl.⁶ ...................................................... B41J 5/30
[52] U.S. Cl. .............................................. 400/61; 400/76
[58] Field of Search ....................... 400/61, 76; 395/112, 395/114, 115

[56] References Cited

U.S. PATENT DOCUMENTS 4,968,159 11/1990 Sasaki ........................................ 400/76
5,036,476 7/1991 Yamaguchi et al. ..................... 364/519
5,471,322 11/1995 Murata ..................................... 358/502

FOREIGN PATENT DOCUMENTS

| 332779 | 9/1989 | European Pat. Off. ....... G06K 15/00 |
| 62-126432 | 6/1987 | Japan .............................. G06F 3/12 |
| 139697 | 6/1991 | Japan ...................................... 400/61 |
| 2250120 | 5/1992 | United Kingdom .............. G06F 3/12 |

OTHER PUBLICATIONS

IBM Technical Disclosure Bulletin, vol. 33, No. 1B, Jun. 1990, New York, pp. 150–152 "Using Device Names To Dynamically Switch Printer Data Printer Data Streams".

*Primary Examiner*—Edgar Burr
*Assistant Examiner*—Charles H. Nolan, Jr.
*Attorney, Agent, or Firm*—Fitzpatrick, Cella, Harper & Scinto

[57] ABSTRACT

An image processing apparatus includes a plurality of analyzers for analyzing externally input different printer languages, a bit map development memory shared by the plurality of analyzers, and a converting unit for converting the input printer language into a common printer language to cause the development memory to perform bit map development. An information processing apparatus includes the converting unit and an output interface for outputting the common printer language to the image processing apparatus having the bit map development memory.

34 Claims, 23 Drawing Sheets

FIG. 10

| NAME OF FONT SCALER 15a | STORAGE ADDRESS OF FONT SCALER PROGRAM | } NORMALLY PROVIDED |
| --- | --- | --- |
| NAME OF FONT SCALER 15b | STORAGE ADDRESS OF FONT SCALER PROGRAM | |
| NAME OF FONT SCALER 15c | STORAGE ADDRESS OF FONT SCALER PROGRAM | ← NEWLY ADDED (DOWN LOADED) |
| EOT | | |

FIG. 14

| | | | | | NORMALLY PROVIDED | |
|---|---|---|---|---|---|---|
| INTERFACE | ADDRESS OF SETTING PROGRAM | | | | | |
| CONTROL | ADDRESS OF SETTING PROGRAM | | | | | |
| MEM | ADDRESS OF SETTING PROGRAM | | | | | |
| EMULATION A | ADDRESS OF SETTING PROGRAM | ADDRESS OF EMULATION PROGRAM | | | | |
| EMULATION B | ADDRESS OF SETTING PROGRAM | ADDRESS OF EMULATION PROGRAM | | | | |
| EMULATION C | ADDRESS OF SETTING PROGRAM | ADDRESS OF EMULATION PROGRAM | | | | |
| INITIALIZATION | ADDRESS OF SETTING PROGRAM | | | | | |
| EOT | | | | | | |

ADDED: { EMULATION C, INITIALIZATION }

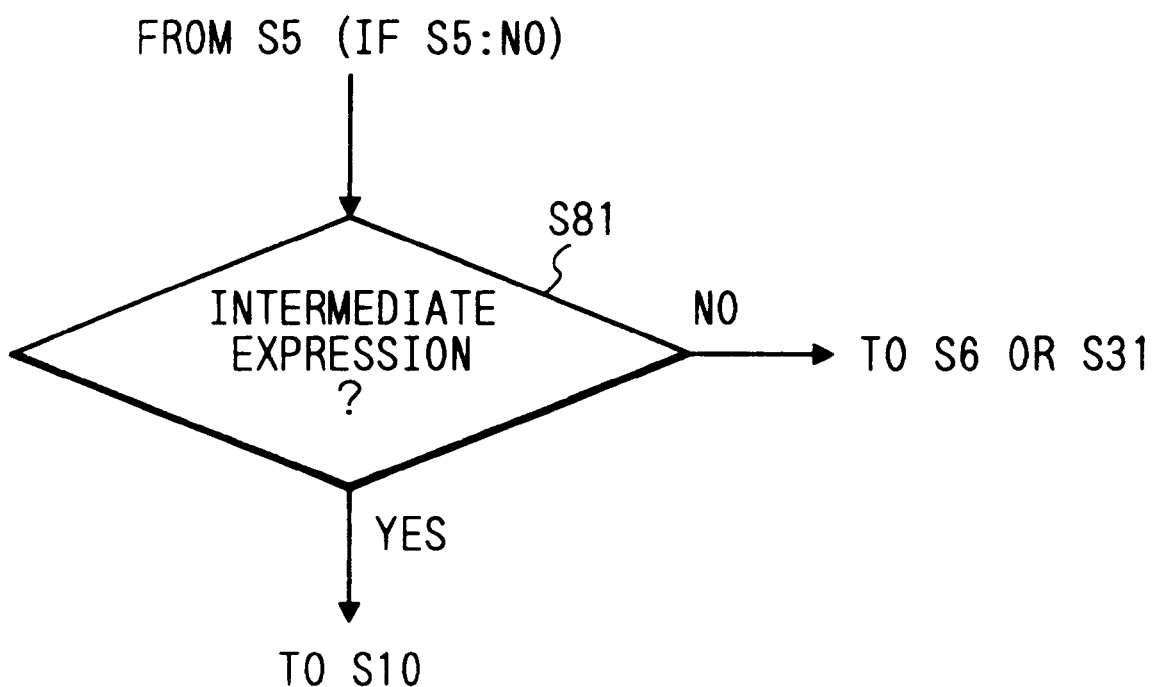

FIG. 20

| #> NAME OF EMULATION A, SIZE Ⓒℝ |
| PRINT DATA FOR EMULATION A |
| #> NAME OF EMULATION B, SIZE Ⓒℝ |
| PRINT DATA FOR EMULATION B |
| #> NAME OF EMULATION C, SIZE Ⓒℝ |
| PRINT DATA FOR EMULATION C |
| #> NAME OF EMULATION D, SIZE Ⓒℝ |
| PRINT DATA FOR EMULATION D |
| # > EOT |

INTERMEDIATE LANGUAGE UPON CHR HANDLING

CLIPPING

| CLIPPING ID CODE | X-COORDINATE OF UPPER LEFT CORNER | Y-COORDINATE OF UPPER LEFT CORNER | WIDTH | HEIGHT |
|---|---|---|---|---|

FIG. 22(A)

DRAWING LOGIC

| DRAWING LOGIC ID CODE | DRAWING LOGIC INFORMATION |
|---|---|

FIG. 22(B)

ENLARGEMENT RATIO

| ENLARGEMENT RATIO ID CODE | X ENLARGEMENT RATIO | Y ENLARGEMENT RATIO |
|---|---|---|

FIG. 22(C)

BIT MAP PATTERN

| BIT MAP ID CODE | BIT MAP PATTERN CODE | X-COORDINATE | Y-COORDINATE |
|---|---|---|---|

FIG. 22(D)

INTERMEDIATE LANGUAGE UPON IMAGE HANDLING

CLIPPING

FIG. 23(A)

| CLIPPING ID CODE | X-COORDINATE OF UPPER LEFT CORNER | Y-COORDINATE OF UPPER LEFT CORNER | WIDTH | HEIGHT |
|---|---|---|---|---|

DRAWING LOGIC

FIG. 23(B)

| DRAWING LOGIC ID CODE | DRAWING LOGIC INFORMATION |
|---|---|

IMAGE PATTERN

FIG. 23(C)

| IMAGE ID CODE | IMAGE PATTERN CODE | MODIFICATION a | MODIFICATION b | MODIFICATION c | MODIFICATION d | MODIFICATION e | MODIFICATION f |
|---|---|---|---|---|---|---|---|

APPARATUS CAPABLE OF COMBINING INPUTS FROM TWO DIFFERENT PRINTER LANGUAGES

This application is a continuation-in-part continuation of application Ser. No. 08/489,781 filed Jun. 13, 1995, now abandoned, which is a continuation of application Ser. No. 08/063,262, filed May 17, 1993, abandoned.

BACKGROUND OF THE INVENTION

1. Field of the Invention

The present invention relates to image and information processing apparatuses and, more particularly, to an image processing apparatus for printing and outputting an image, based on input data, on a predetermined recording medium and an information processing apparatus for outputting data for printing and outputting the image on the predetermined recording medium, to the image processing apparatus.

2. Related Background Art

A typical example of such an apparatus is a high-precision, high-speed page printer, and particularly a laser beam printer. Some recent page printers have various functions including a function of printing smooth characters using outline fonts regardless of enlarged/reduced characters.

Most of the apparatuses of this type have functions of emulating conventional printers used with a lot of currently available application programs, to take advantage of their resources. That is, a plurality of printer languages can be translated to emulate different types of printers.

A page printer receives data of one page to print a one-page image. Prior to recording one page, an image such as a character pattern to be printed must be developed in a one-page memory. The destination of each character pattern in the memory must be determined prior to the actual development of each character pattern. In some cases, the specific size and type of character pattern must also be determined.

Assume that print data for a printer whose carriage is simply reciprocated is to be emulated. In this data, a control command for determining only the recording position or the like of the first character is generally present, and character codes simply follow this control command. When this data is to be emulated, data having different formats must be finally generated, and pattern development based on the generated data must be performed. As a result, the printer cannot be free from complicated processing required until pattern development is started.

If a large number of emulation functions are available, the numbers of analyzers (emulation programs) and of bit map development units must each be equal to the number of printer languages. The memory size inevitably increases, resulting in high cost.

SUMMARY OF THE INVENTION

The present invention has been made in consideration of the above situation, and has as its object to provide an image processing apparatus capable of performing high-speed image output processing independently of printer languages.

The present invention has been made in consideration of the above situation, and has its object to provide an information processing apparatus capable of reducing the cost of an image processing apparatus having an emulation function.

In consideration of the above situation, according to the present invention, there is provided an image processing apparatus comprising:

a plurality of analyzing means for analyzing externally input different printer languages;

bit map developing means shared by the plurality of analyzing means; and converting means for converting the input printer language into a common printer language to cause the developing means to perform bit map development.

In consideration of the above situation, according to the present invention, there is also provided an information processing apparatus comprising:

converting means for converting different printer languages into a common printer language for performing bit map development; and output means for outputting the common printer language to an image processing apparatus having bit map developing means for performing bit map development on the basis of the common printer language converted by the converting means.

In consideration of the above situation, according to the present invention, there is further provided an image processing apparatus comprising:

a plurality of analyzing means for analyzing externally input different printer languages;

bit map developing means shared by the plurality of analyzing means;

converting means for converting the input printer language into a common printer language to cause the developing means to perform bit map development;

determining means for determining whether the input printer language is the common printer language; and supply means for supplying the input printer language to the bit map developing means when the determining means determines that the input printer language is the common printer language.

According to each image processing apparatus of the present invention, as described above, the common printer language for performing bit map development is generated to perform high-speed output processing independently of the particular printer language used for input.

According to the information processing of the present invention, as described above, the common printer language for bit map development can be output to the image processing apparatus to reduce the cost of the image processing apparatus having the emulation function.

BRIEF DESCRIPTION OF THE DRAWINGS

FIG. 10 is a font attribute table common to all the illustrated embodiments;

FIG. 14 is a management table common to all the illustrated embodiments;

FIG. 17 is a flow chart of processing added in the fourth embodiment;

FIG. 18 is a format of intermediate language data sent from an external apparatus in the fourth embodiment;

FIG. 20 is an input data format in the fifth embodiment;

FIGS. 22(A) to 22(D) are detailed formats of an intermediate language during character handling in all the illustrated embodiments;

FIGS. 23(A) to 23(C) are detailed formats of the intermediate language during image handling in all the illustrated embodiments;

DESCRIPTION OF THE PREFERRED EMBODIMENTS

An embodiment according to the present invention will be described with reference to the accompanying drawings. This embodiment exemplifies a laser beam printer (resolution: 300 dpi). As will be apparent from the following description, the present invention is equally applicable to a thermal transfer printer, an ink-jet printer, a wire-dot impact printer, or the like. The present invention is not limited to any specific printing scheme or printer.

Description of General Arrangement and Operation

Figure 1:
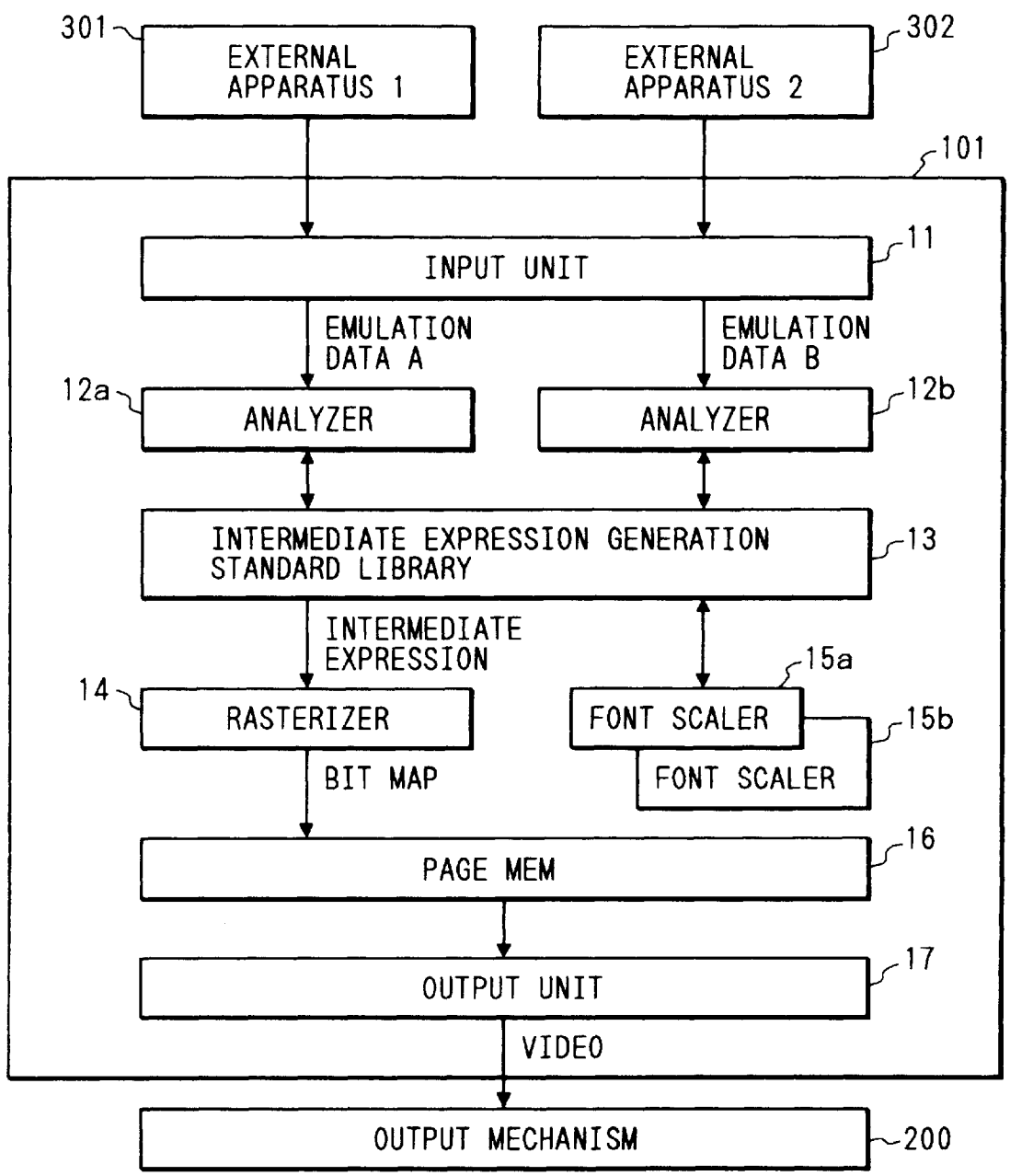
FIG. 1 is a schematic block diagram of an image processing apparatus according to the first preferred embodiment of the present invention.

FIG. 1 is a schematic block diagram of an image processing apparatus according to an embodiment of the present invention. The operation of this embodiment will be generally described below.

A plurality of external apparatuses 301 and 302 serving as print data sources are connected to the apparatus of this embodiment (for this reason, the apparatus has a plurality of input interfaces). An input unit 11 in a printer control unit 101 (to be described in detail later) receives print data (consisting of a printer language) sent from the external apparatuses 301 and 302. The input unit 11 validates only the data from the external apparatus which has sent the print data first. While the print data is continuously sent from this external apparatus, the input unit 11 inhibits reception of print data from the other external apparatus.

The contents of the received print data are analyzed to select a specific one of the analyzers of the apparatus, which then processes the input print data. In other words, the input unit 11 checks a control command contained in the received print data and selects a specific printer language corresponding to this control command. The input unit 11 then supplies the printer language to one of a plurality of analyzers 12a and 12b, the chosen analyzer being one which can translate this printer language. That is, the input unit 11 includes an automatic interface switching function and an automatic analyzer selection function.

The analyzers 12a and 12b can be regarded as emulation programs for translating control commands contained in different printer languages. It should be noted in this embodiment that either analyzer (emulation program) generates common intermediate expression language data (to be referred to as simply "intermediate language data" hereinafter) but does not perform dot development. Details of the intermediate language data will be described in detail later.

Each analyzer receives a printer language suitable for itself and generates dot pattern generation intermediate language data with reference to an intermediate expression generation standard library 13 (a set of various functions associated with intermediate language generation) and font scalers 15a and 15b. As described above, the printer languages analyzed by the respective analyzers are different from each other, but the respective analyzers output common intermediate language data (common, that is, to all of the analyzers).

An output from any analyzer can be transferred to a common dot pattern development unit (rasterizer) 14. The rasterizer 14 rasterizes the input data as dot data, and the dot data can be developed in a page memory (bit map memory) 16. The dot image developed in the page memory 16 is sequentially output as video signals to an output mechanism (printer engine) 200 through an output unit 17, thereby printing the output data.

In the above processing, when an analyzer (emulation program) is to be newly prepared, the emulation program need not contain a program associated with dot development, but can contain only a program for generating data (intermediate language) which can be executed by the rasterizer 14, thereby reducing the load on the programmer. In addition, the size (memory capacity) of the analyzer can be reduced, as a matter of course, thereby contributing to a decrease in cost.

Description of Intermediate Language Data

An intermediate language will be described below.

Received print data (consisting of a printer language) is generally in a relatively high-level language, that is in one which is easily understandable to a human being. In other words, the print data is not data having a format directly translated by the CPU in the image forming apparatus. Each body of print data may be translated every time it is received to generate corresponding dot data. The time required to do so is not negligible. As a result, the time required until the external apparatus is released from print data output processing is undesirably prolonged.

To prevent this, received data is converted into language data (i.e., data which can be easily translated by the CPU) having a lower level than that of the received data, and the converted data is stored and held. When this low-level language data is stored e.g., one page at a time, in an intermediate language area 24c (to be described later), actual dot development is performed. The low-level language data is called intermediate language data in this embodiment.

That is, the intermediate language data is in a printer language converted to facilitate dot development.

For example, in printing even a character, the CPU generates the corresponding character pattern on the basis of various kinds of information such as the type of character, enlargement ratio, print position, rotational direction, and modification information, and the generated character pattern can be developed in a print memory. In this embodiment, the intermediate language data generated by the analyzers 12a and 12b have a format consisting of an identification code for identifying the type of processing and parameters following the identification code to transfer control to this processing:

Intermediate Language Data Format (binary data: . . . identification code, p1, p2, . . . , pn, identification code, p1, p2, . . . , pm, . . . ), (where p1, . . . pm, . . . , pn represent parameters, the number of which depends on a given identification code).

The rasterizer 14 executes a function (subroutine program) corresponding to a corresponding identification code to execute the generated intermediate language data. At this time, if corresponding parameters are present, the parameters are also transferred to the function prior to execution of the generated intermediate language data. In practice, an analyzer (not shown) in the rasterizer 14 stores a function corresponding to an identification code contained in the intermediate language data, and the function corresponding to the identification code in the intermediate language data is executed.

Figure 4:
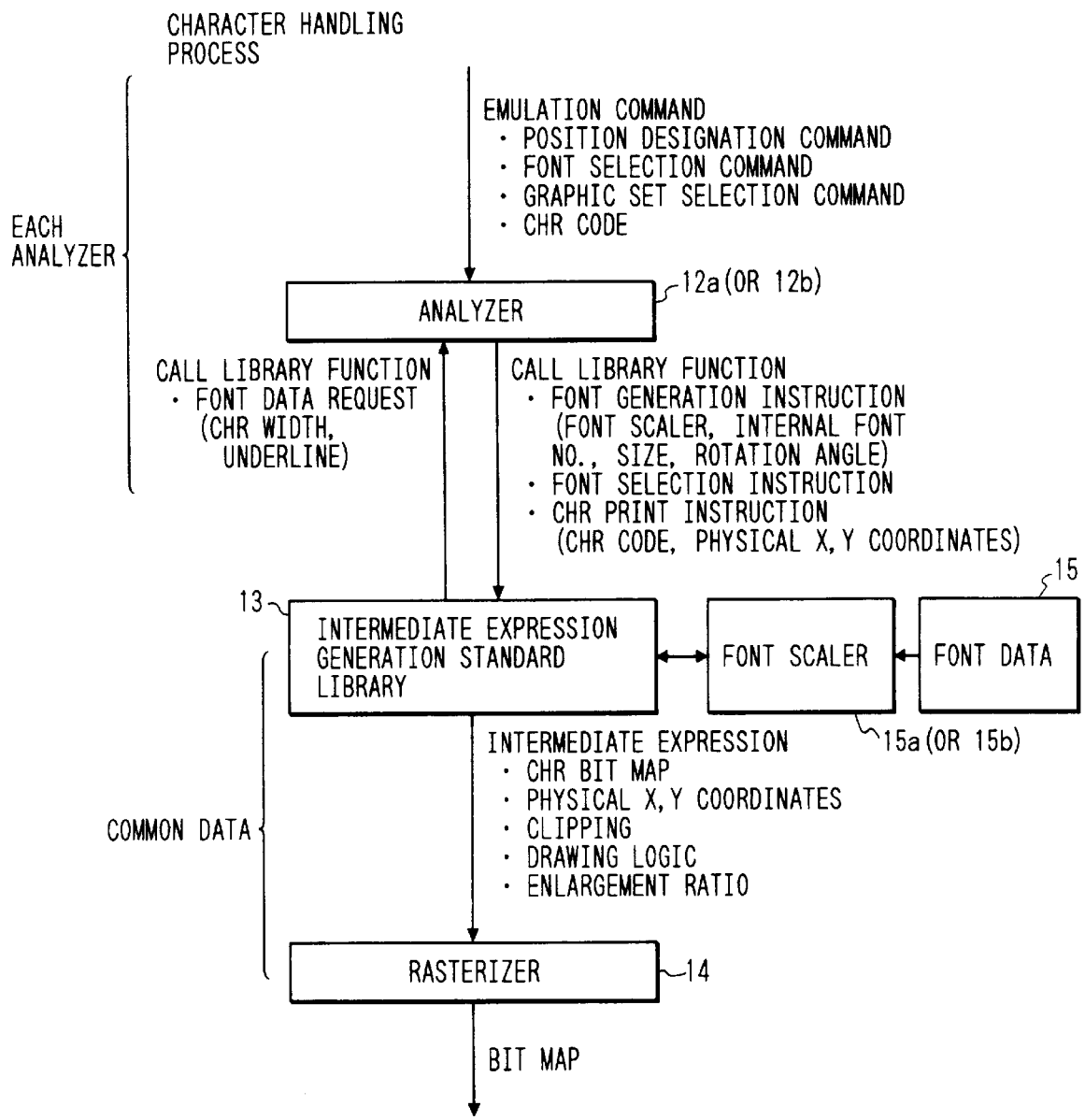
FIG. 4 is a diagram of a character handling process in the first embodiment.
Figure 5:
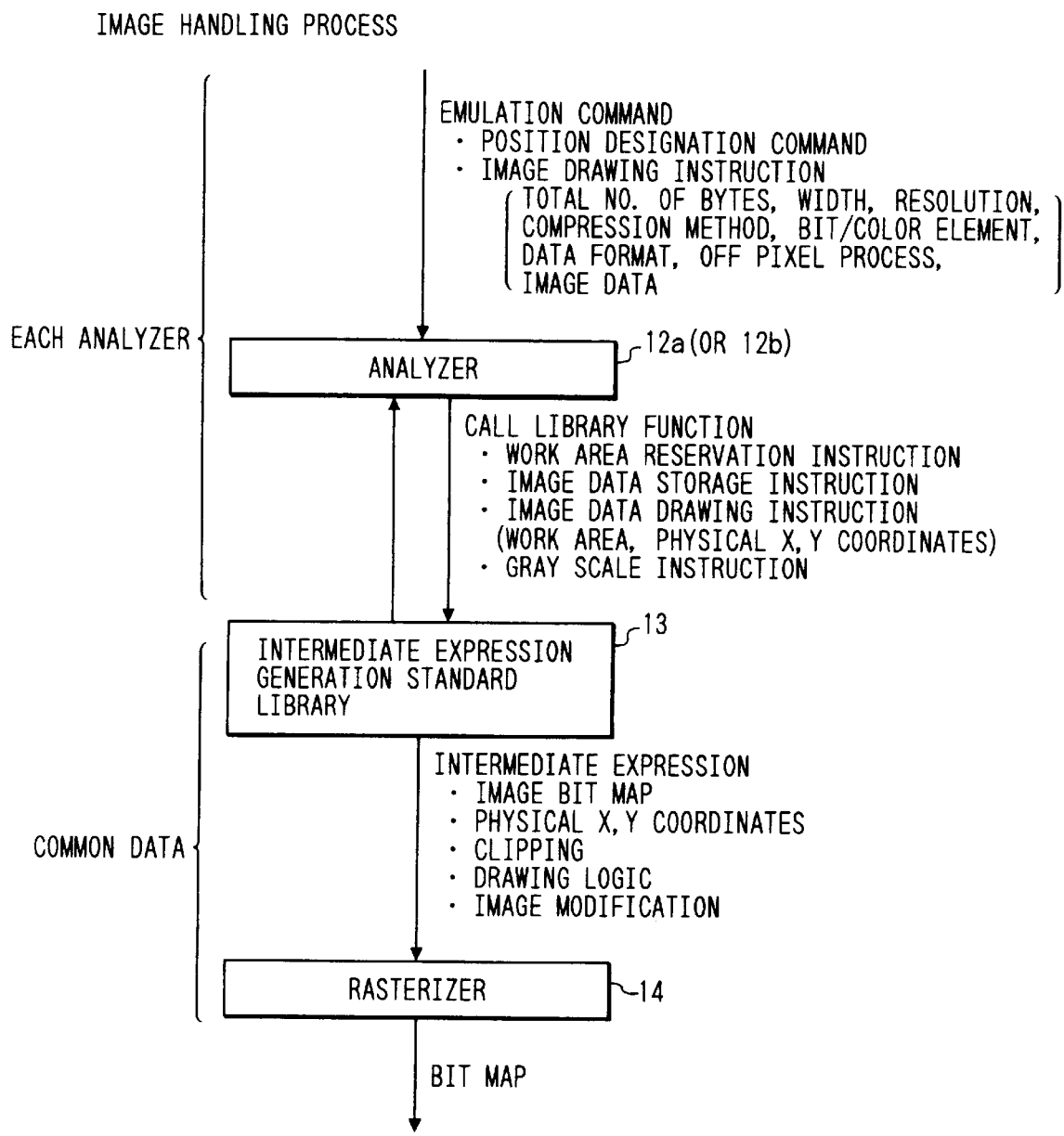
FIG. 5 is a diagram of an image handling process in the first embodiment.

FIGS. 4 and 5 show a schematic flow of processing of this embodiment. FIG. 4 shows the processing associated with a character handling process, and FIG. 5 shows the processing associated with an image handling process. The character handling process will be briefly described with reference to FIG. 4. When the analyzer 12a (or 12b) receives a position designation command (logic coordinates), a font selection command, a character code, and the like contained in the data received through the input unit 11, the analyzer 12a analyzes the received data and generates the identification information (ID code) and its parameters using various functions stored in the intermediate language generation standard library 13, thereby generating intermediate expression data. This operation also applies to the analyzer 12a (or 12b) for the image in FIG. 5. Various kinds of generated information for a character are a character bit map, physical X- and Y-coordinate designation command, clipping information, and the like. As for image data, the analyzer 12a (or 12b) generates a work area reservation instruction of each input image and information specifying the image. At the same time, the analyzer 12a generates intermediate expression data including image development position information of the data stored in the reservation position, clipping information, and image modification information if necessary (if the received print data contains an image modification instruction).

An example of an intermediate language upon character handling is shown in FIGS. 22(A) to 22(D), and an example of an intermediate language upon image handling is shown in FIGS. 23(A) to 23(C). The intermediate language generated upon character handling includes clipping, drawing logic, an enlargement ratio, and a bit map pattern. The intermediate language generated upon image handling includes identical data to those of the intermediate language generated upon character handling, and information associated with an image pattern. These intermediate language data are not all the intermediate language data handled in this embodiment. In either character or image data, an identification ID code (information which specifies a call function) representing the meaning of each of the intermediate language data is present at the start of the generated intermediate language data. Data following the identification ID are parameters transferred to corresponding processing. The number of parameters depends on the each identification ID.

Note that the clipping (commonly present in character handling and image handling) is used to develop a character or image pattern within a designated rectangular area (this area is designated by the upper left X- and Y-coordinates, a width, and a height). In other words, clipping is a declaration statement for inhibiting development in any portion outside this area unless another clipping is present. A parameter "drawing logic" in the drawing logic (commonly present in character handling and image handling) represents an instruction for designating a logic expression for developing a pattern or image. More specifically, information for instructing overwrite development, transparent development (logical OR) or exclusive OR development of the developed pattern is stored. In this case, the current logic is used for the subsequent patterns unless a specific instruction is input. The enlargement ratio information has two parameters because the horizontal and vertical enlargement ratios are independent of each other. A bit map pattern has coordinate position parameters for development in addition to information for specifying one bit map pattern to be developed.

The intermediate language data upon image handling have almost the same contents as described above. The format of intermediate language data for developing a received image as its feature will be described below.

As previously described, when image data is received, the analyzer 12a (or 12b) stores the image data in a work area 24a in a RAM 24 and generates an ID number unique to this image data. An "image pattern code" in FIG. 23(C) represents this ID code. Parameters following the ID code are parameters transferred to image pattern development processing. These parameters are data represent how the image data specified by the image pattern code is modified. More specifically, these six pieces of information represent elements in a matrix used in processing for modifying an image patten development function. The image pattern development function converts the original coordinates (XS,YS) of each pixel in the designated pattern into modification destination coordinates (XD,YD) in accordance with the matrix consisting of the given parameters. A pixel present at the coordinates (XS,YS) in the original pattern is transferred to coordinates (XD,YD). These coordinates do not represent absolute coordinate values of the memory for developing a print image, but local coordinates within the rectangular area specified by the clipping.

Referring to FIG. 4 or 5, the formats of print data input to the analyzers 12a and 12b are greatly different from each other, depending on the printer languages to be analyzed by the analyzers. As described above, the intermediate language is the printer language converted to facilitate translation of the rasterizer 14.

Description of Detailed Arrangement

Figure 2:
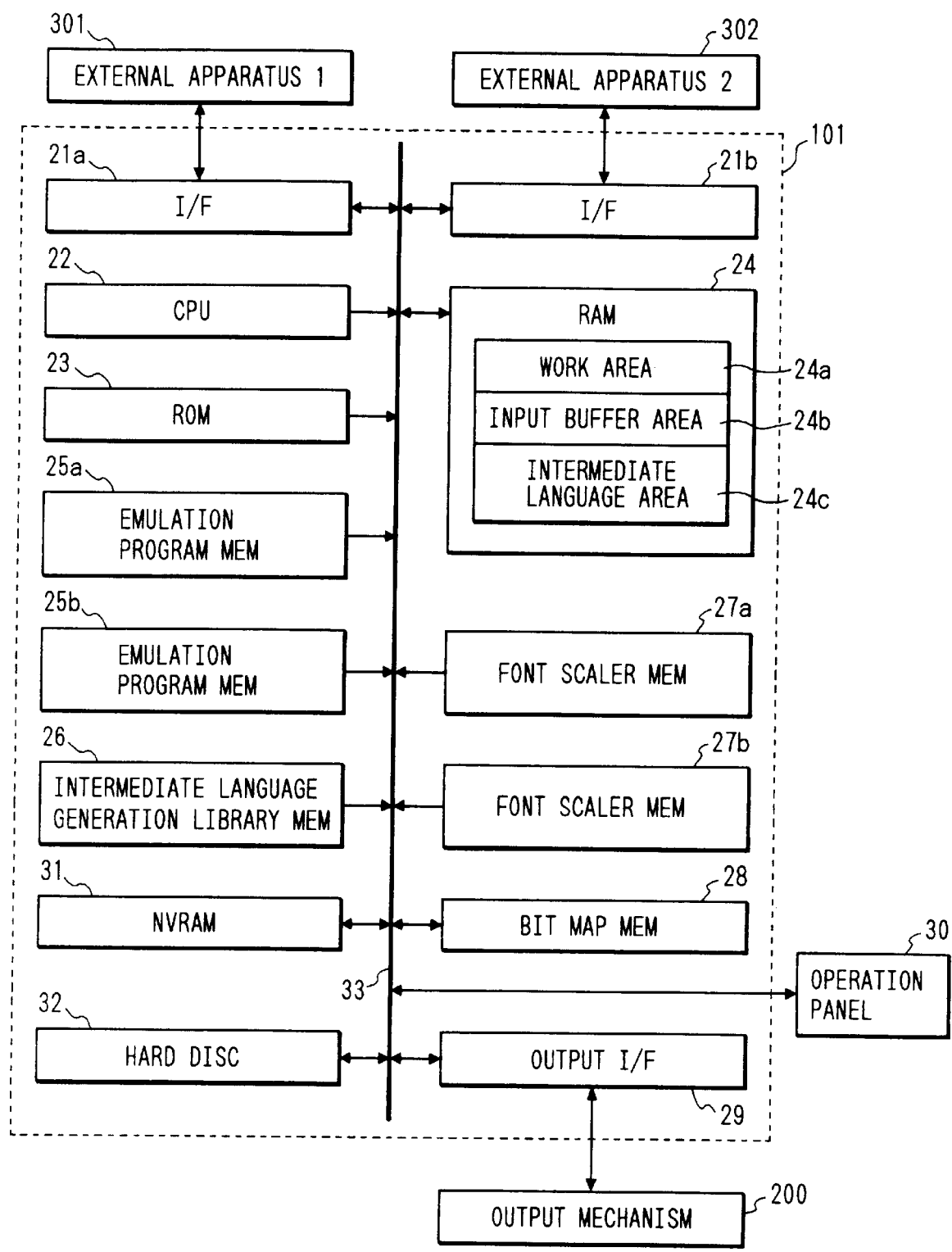
FIG. 2 is a block diagram showing an arrangement of an image processing apparatus common to all of the illustrated embodiments.

The detailed arrangement of the image processing apparatus of this embodiment is shown in FIG. 2. This arrangement applies as a common structure to all the following embodiments.

The image processing apparatus includes a printer control unit 21 and interfaces (I/Fs) 21a and 21b respectively connected to the external apparatuses (host computers or the like) 301 and 302. Each interface may be a parallel or serial interface. A CPU 22 controls the overall operation of the apparatus. A ROM 23 stores basic programs (i.e., programs associated with data fetch through I/Fs and a processing sequence (to be described later) in FIG. 6) executed by the CPU 22. The RAM 24 includes the work area 24a referred to during execution of various processing operations of the CPU 22, an input buffer area 24b for temporarily storing received print data, and the intermediate language area 24c for storing the intermediate language data described above. Although the RAM 24 has other data areas, they will be described in detail later. Memories 25a and 25b (corresponding to the analyzers 12a and 12b in FIG. 1) store emulation programs for translating various printer languages. The memories 25a and 25b comprise ROMs or the like. An intermediate language generation library memory 26 (corresponding to the intermediate expression generation standard library 13 in FIG. 1) stores a set of various functions for generating the intermediate language. Memories 27a and 27b store font scaler data to allow printing of different types of characters (e.g., Gothic and Mincho typefaces), as will be described in this embodiment. The contents of the font scaler memories 27a and 27b include a program for generating outline font data 15 of each typeface and a final character pattern based on the outline font data 15. The memories 26, 27a, and 27b comprise ROMs or the like.

A bit map memory 28 (corresponding to the page memory 16 in FIG. 1) has a capacity for developing a one-page dot image. An output I/F 29 sequentially outputs the dot information developed in the bit map memory 28 in the form of video signals to a printer engine (output mechanism) 200. A nonvolatile memory (to be referred to as an NVRAM hereinafter) 31 stores and holds various setting contents and comprises, e.g., an $E^2PROM$. An operation panel 30 comprises various operation buttons and an LCD display unit. A hard disc 32 stores various data downloaded from the external apparatuses 301 and 302 to the work area 24a of the RAM 24. The above constituent components are connected to a system bus 33.

The structure of the printer engine 200 of a laser beam printer of this embodiment will be described with reference to FIG. 3.

Figure 3:
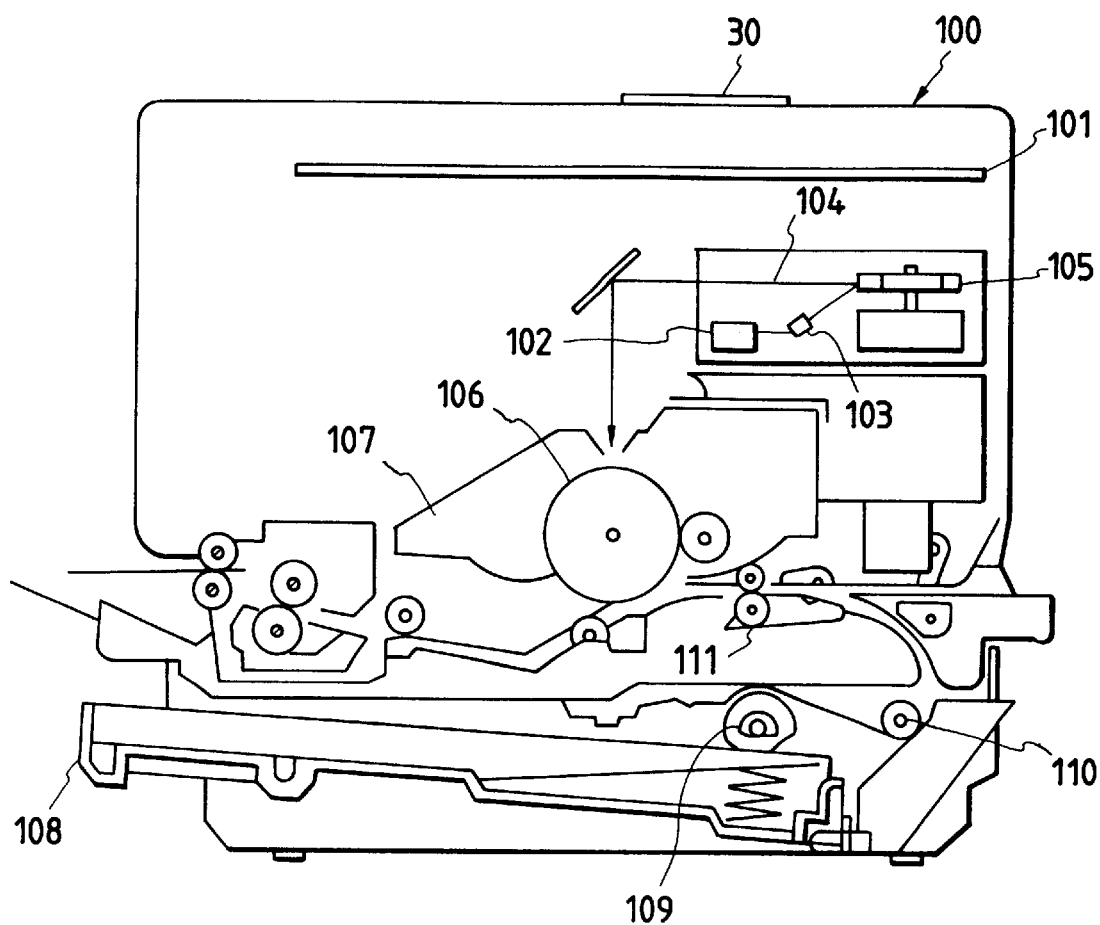
FIG. 3 is a view showing a structure of a printer engine common to all the illustrated embodiments.

Referring to FIG. 3, the laser beam printer includes a laser beam printer main body (LBP) 100 and the printer control unit 101 which includes all the components surrounded by the dotted line in FIG. 2. The printer control unit 101 mainly converts character information to a video signal of the corresponding character pattern and outputs it to a laser driver 102.

The laser driver 102 is a circuit for driving a semiconductor laser 103. The laser driver 102 ON/OFF-controls a laser beam 104 from the semiconductor laser 103 in accordance with the video signal input through the output I/F (interface) 29. The laser beam 104 is shifted in the right-and-left direction by a rotary polygonal mirror 105 and scans and exposes an electrostatic drum 106, thereby forming a latent image corresponding to the character pattern on the electrostatic drum 106. This latent image is developed by a developing unit 107 located around the electrostatic drum 106 and is transferred to recording paper. The recording paper is a cut sheet. The recording sheets are stored in a paper cassette 108 attached to the LBP 100. Each recording sheet is picked up by a paper pickup roller 109 and fed into the apparatus by convey rollers 110 and 111. The sheet is then supplied to the electrostatic drum 106.

Description of Processing Contents

Although a description gets out of order, in this embodiment, when print data is output from, e.g., the external apparatuses 301, the corresponding I/F 21a outputs an interrupt signal to the CPU 22. Upon reception of this interrupt signal, the CPU 22 executes interrupt processing (routine), as will be briefly described below.

In the interrupt routine, the CPU 22 loads the input data from the interrupted I/F 21a and stores it in the input buffer area 24b. When all I/Fs are released, as upon power-ON, only the I/F which outputs the print data first (i.e., the I/F which generates the interrupt signal first) is enabled, and the remaining I/Fs are disabled (any other print data is not accepted).

Based on the assumption that the above interrupt processing is performed, the operation sequence (main routine) of the CPU 22 will be described with reference to FIG. 6.

When the power switch of the apparatus is turned on, initialization is performed in step S1. This initialization includes an operation for releasing all the input I/Fs 21a and 21b. In step S2, the CPU 22 determines whether all the I/Fs 21a and 21b are set in an on-line state (data receivable state). If YES in step S2, the flow advances to step S3 to determine whether the print data is stored in the input buffer area 24b.

If YES in step S3, the flow advances to step S4 to initialize the I/F release time (i.e., a timer (not shown) is reset). The meaning of the I/F release time will be clarified in the following description.

The CPU 22 determines in step S5 whether a specific analyzer is selected for the input data, i.e., whether either the emulation program memory 25a or 25b is used. In the initial state, selection of the emulation program memory is not determined. The flow advances to step S6. However, when processing of the print data is in progress to some extent, i.e., when the emulation program is already selected, the flow branches to step S9.

In step S6, a specific printer language is selected on the basis of the control code contained in the data stored in the input buffer area 24b, and the corresponding emulation program is selected. At this time, if the corresponding emulation program is not present or a plurality of emulation programs are present (step S7), the flow advances to step S8 to select a default analyzer. If a plurality of analyzer candidates are determined to be present, the emulation program having a top priority is selected (the priority order is predetermined). In this manner, one emulation program is determined.

Assume that it is determined in step S5 that one of the emulation programs is already selected, that a matching emulation program is selected in step S6, and that the default emulation program is selected, the flow advances to step S9.

In step S9, the selected (or already selected) emulation program (analyzer) is executed (called). The emulation program to be executed have a content varying depending on types of emulation programs. In any case, when analysis is executed and the flow returns to the main routine (step S10), intermediate language data to be printed on one sheet is stored in the intermediate language area 24c in the RAM 24.

In step S10, the corresponding bit map pattern is developed in the bit map memory 28 on the basis of the generated intermediate language data.

When the pattern to be printed on one sheet is developed, the flow advances to step S11 to output a known video signal through the output I/F 29. When printing on one sheet is completed, the flow returns to step S3, and the above processing operations are repeated. Every time one cycle is completed, the I/F release time is reset, and a proper emulation program is selected. In this case, YES is obtained in step S5, and the operations in steps S6 to S8 are not performed.

While printing continues based on the uniquely selected emulation program, the external apparatus which has output the print data stops outputting print data and data to be processed is not present in the input buffer area 24b, the flow branches from step S3 to S12.

The CPU 22 determines whether the I/F release time has elapsed. That is, the CPU 22 determines whether the external apparatus has finished outputting a series of print data. If NO in step S12, the flow returns to step S2 to loop steps S3 and S12. When the CPU 22 determines that print data from the external apparatus has not been received after a lapse of the I/F release time, the flow advances from step S12 to step S13 to release all the I/Fs 21a and 21b to allow reception from all the external apparatuses 301 and 302.

In the main routine, print data is developed in the bit map memory 28 in accordance with the common intermediate language data generated by each emulation program. Therefore, the respective emulation programs can be free from development of bit map data.

Figure 7:
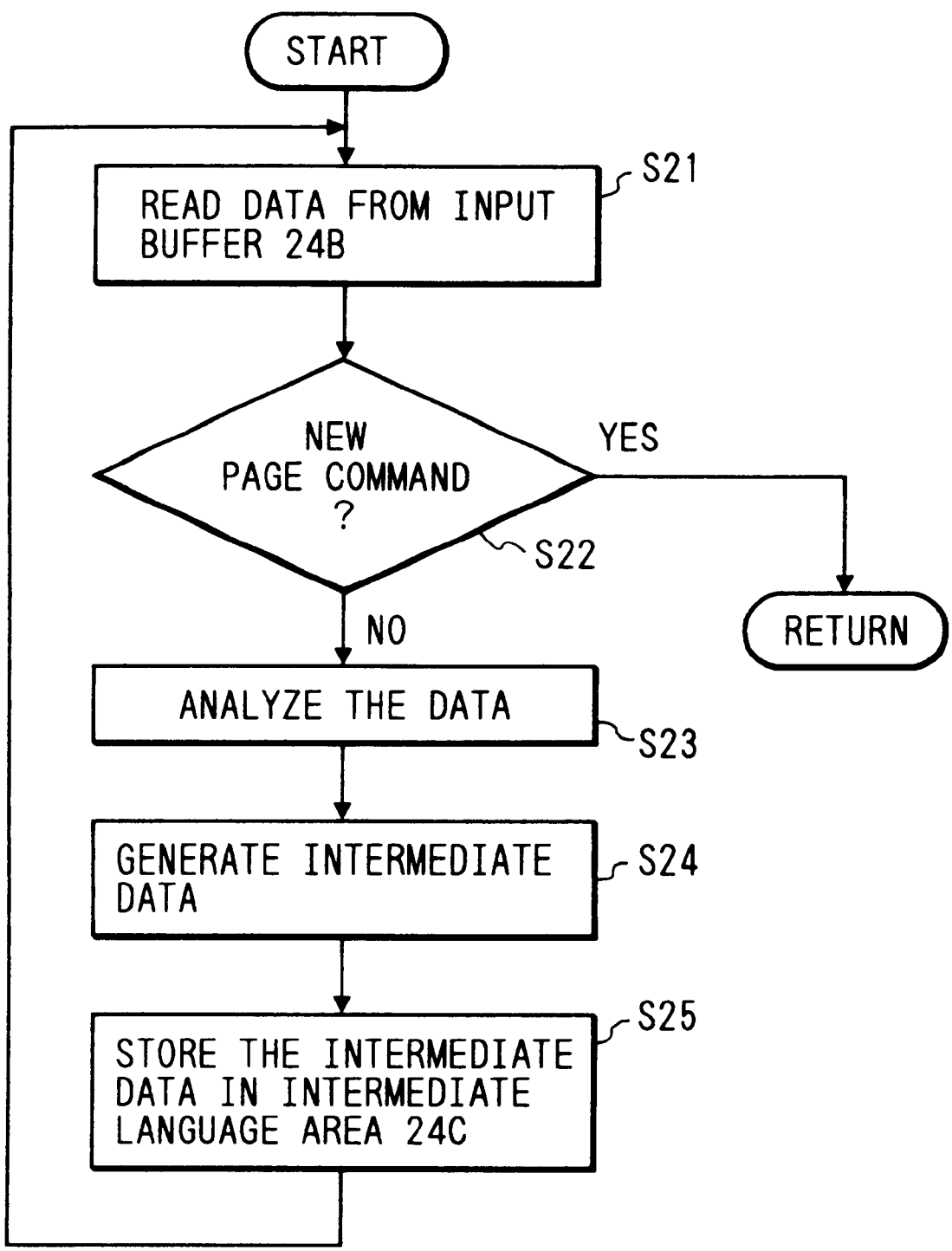
FIG. 7 is a flow chart showing a process of an analyzer in the first embodiment.

The contents of analysis of the emulation program in step S9 will be described with reference to a flow chart in FIG. 7. The following emulation program corresponds to one printer language.

When this emulation program, e.g., the emulation program memory 25a is called in the main routine, analysis is performed using the input data stored in the input buffer area 24b in step S21. The CPU 22 determines in step S22 whether the input data is a new page command (print command). If NO in step S22, the flow advances to step S23 to analyze this data (step S23). The identification code and its parameters are generated to form intermediate language data using various functions stored in the intermediate language generation library memory 26 (step S24), and the resultant intermediate language data is stored in the intermediate language area 24c. Until a new page command is detected, the operations from step S21 are repeated. When a new page command is detected, the flow returns to step S10 of the main processing.

When the flow returns to the main routine in the manner, one-page intermediate language data is stored in the intermediate language area 24c.

An emulation program for a printer language for a printer for reciprocating a carriage to print information is processed in principle as described above. However, as a new page command may not be received, the number of lines based on a line pitch for the language to be emulated may be used to determine the decision block in step S22.

Even if a printer language which does not designate a specific font is received (i.e., even if its emulation program is a program not depending on a specific font scaler), a user selects a font scaler on the operation panel 30 or determines it in advance (the setting content may be stored and held in the NVRAM 31) to obtain a desired print result. In other words, the font scalers 15a and 15b arranged in the apparatus can be freely used as common resources.

As described above, according to this embodiment, the common intermediate language generation library memory 26 is arranged, and the emulation program memories 25a and 25b perform only an operation for generating the common intermediate language data. A development environment for newly developing an emulation program can be improved, and a memory capacity for this can be small, thereby reducing the cost. One emulation program may selectively use fonts of a plurality of font scalers.

In the above embodiment, every time each analyzer generates one-page intermediate language data, the flow returns to the main routine. However, the amount of intermediate language data need not be one page, but can be smaller than one page. In addition, dot pattern development based on the intermediate language data may be performed simultaneously with intermediate language data generation.

Description of Second Embodiment

In the above embodiment (first embodiment), the font scalers 15a and 15b arranged in the apparatus are used. However, a font scaler 15c desired by an external apparatus may be transmitted and registered in the apparatus. That is, font scaler data is downloaded from the external apparatus to the apparatus of the present invention. This will be described as the second embodiment. The number of font scalers to be newly registered is not limited to one, but may be two or more.

Figure 8:
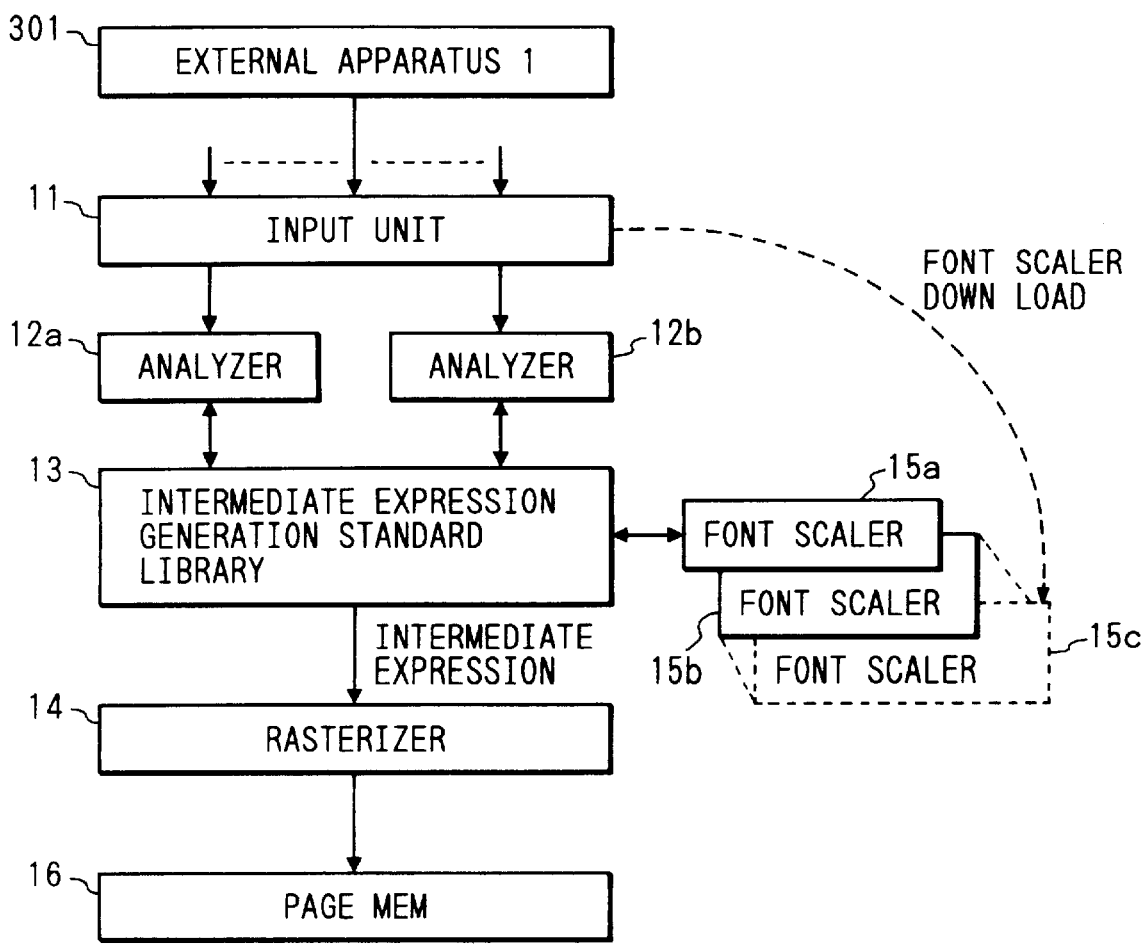
FIG. 8 is a schematic block diagram of an image processing apparatus according to the second preferred embodiment.

The schematic arrangement of the second embodiment is shown in FIG. 8 and will be described below.

Referring to FIG. 8, for example, an external apparatus 301 sends a control command (download command) for downloading font scaler data to the apparatus of this embodiment, a code representing that the download data is font scaler data, the total number of bits to be sent, font scaler data, and check sum data. In addition to the download command, the code representing the type of data is also sent because a download object is not limited to the font scaler data (this will be described in a subsequent embodiment). Processing for discriminating whether input data is font scaler data is performed before processing (step S6 in FIG. 6) for discriminating a printer language when an input unit 11 inputs normal print data. Note that the external apparatus is not limited to the external apparatus 301, but may be an external apparatus 302 or any other external apparatus.

Processing for determining whether an input command is a download command and processing for executing a download operation (if so) may be added to each emulation program. A program itself to be downloaded need not be set in each emulation program. If this program is stored in a ROM 23, only processing for discriminating whether the input command is a download command and processing for calling this download determination processing can be executed to reduce the memory capacity accordingly.

In the second embodiment, the external apparatus sends a download command, data representing the total number of bytes of a font scaler (a program for enlarging or reducing a character pattern and generating an enlarged or reduced character pattern and its outline font data), and then actual font scaler data. These data are stored in an input buffer area 24b in a RAM 24.

The font scaler data thus sent is finally stored in a work area 24a in the RAM 24. Font scaler management information (font attribute table) held in the work area 24a in the RAM 24 is updated. When the power switch is turned off, the downloaded data and the font attribute table are erased. The downloaded data can be stored in a hard disc 32, as needed. When the power switch is turned on, the font attribute table is accessed on the basis of the data from the hard disc 32. Note that the storage contents of the RAM 24 are held by a backup battery (not shown).

Th user can utilize the newly downloaded font scaler 15c as the common resource. That is, as in existing font scalers 15a and 15b, the downloaded font scaler data can be freely selected independently of emulation programs.

To realize the above processing, the operation sequence of a CPU 22 in the second embodiment will be described with reference to a flow chart in FIG. 9. This flow chart is inserted when NO is obtained in step S5 in FIG. 6, i.e., immediately before step S6.

NO is obtained in step S5 when an analyzer (emulation program) to be printed is determined not to be selected, i.e., when print data is received for the first time upon a power-ON operation or new data is received upon completion of a series of print operations and release of all input I/Fs 21a and 21b.

Figure 6:
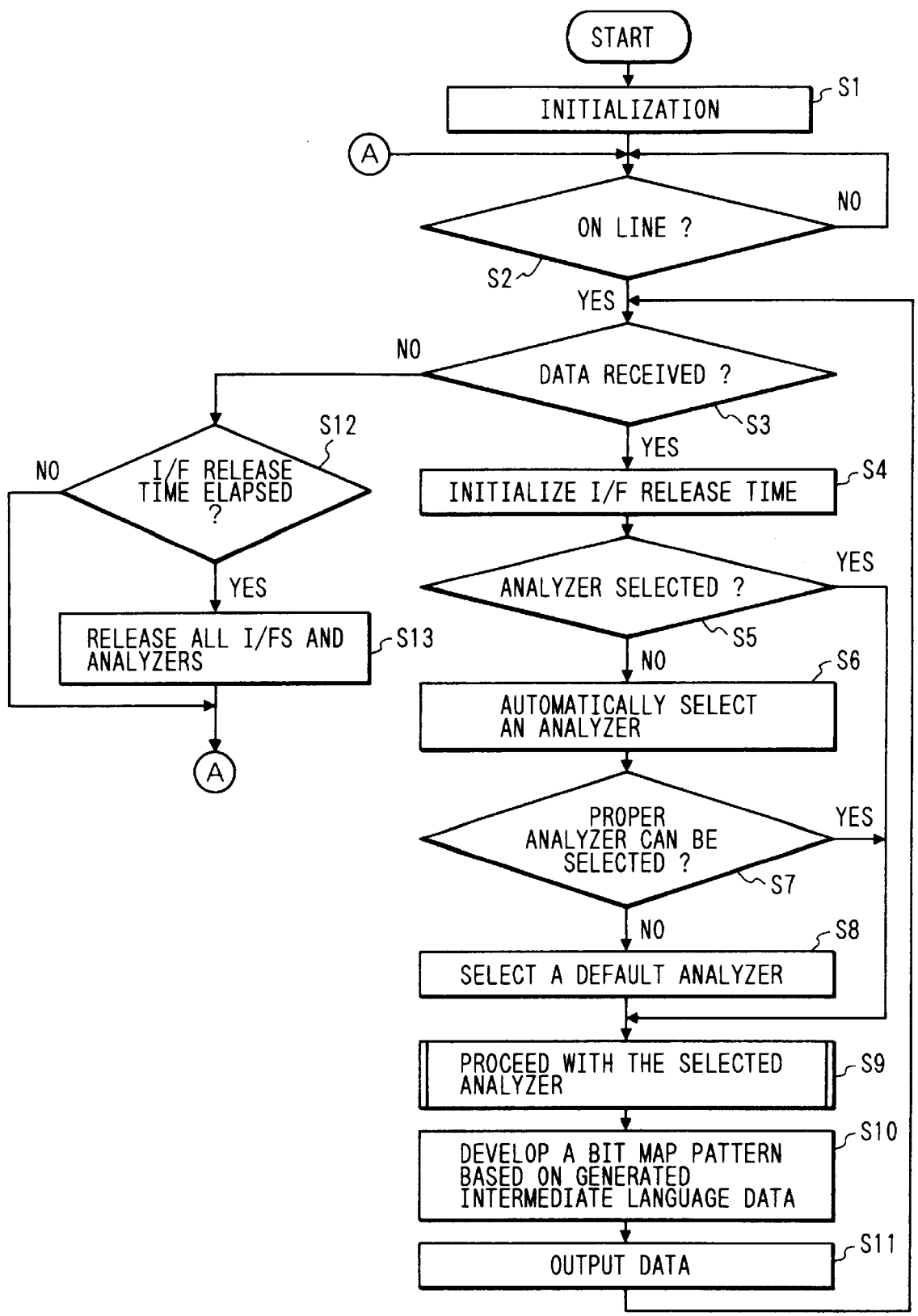
FIG. 6 is a flow chart showing a main routine in the first embodiment.
Figure 9:
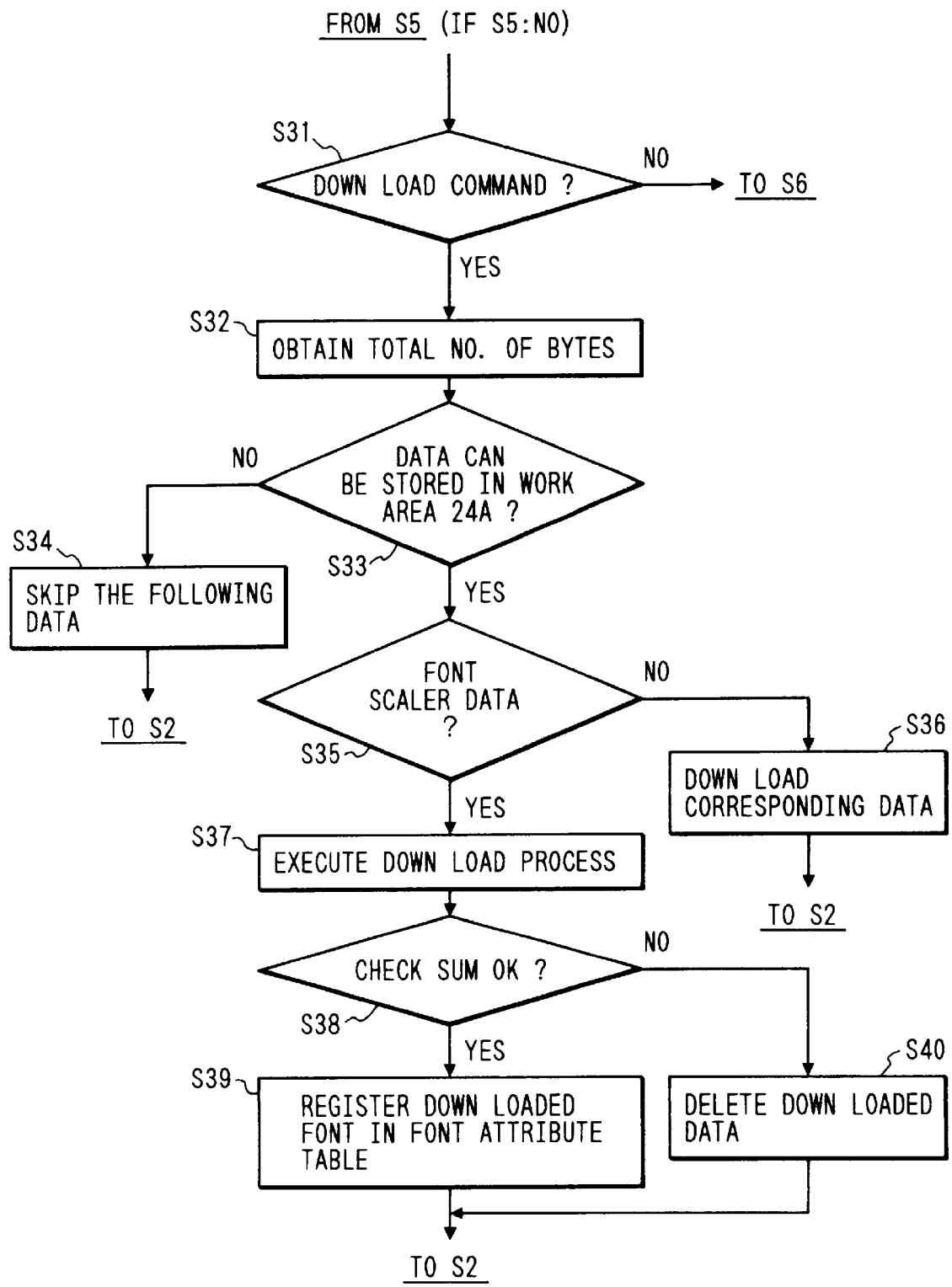
FIG. 9 is a flow chart showing the contents of processing added in the second embodiment.

When NO is obtained in step S5 in FIG. 6 and the flow advances to step S31 in FIG. 9, the CPU 22 determines whether the input data is a download command. If the CPU 22 determines that the input data is not a download command, but print data, the flow advances to step S6 in FIG. 6, as previously described.

If the CPU 22 determines in step S31 that the input data is the download command, the CPU 22 obtains the total number of bytes in step S32. The total number of bytes to be received is compared with the empty capacity of the work area 24a in the RAM 24 to determine whether the data can be stored in the work area 24a in the RAM 24. If NO in step S33, the following data is skipped, and the flow returns to step S2 in FIG. 6. At this time, when skip processing is completed, the other input I/F which has been disabled is released.

If YES in step S33, the CPU 22 determines in step S35 whether data to be sent is font scaler data. If NO in step S35, the flow advances to step S36 to download the corresponding data, and the flow returns to step S2. At this time, when download processing is completed, the other I/F which has been disabled is released. The determination in step S35 is performed by determining whether the download command is present in the data to be sent.

If the CPU 22 determines that the input data is the font scaler data (i.e., the download command is contained in the input data), the flow advances to step S37, and data sequentially input are stored in the work area 24a allocated in the RAM 24. At this time, the total number of bytes is calculated during storage of the input data in the work area 24a. In addition, the data downloaded in the work area 24a can also be stored in the hard disc 32.

As described above, the input data is finally downloaded in the work area 24a in the RAM 24. The number of bytes finally received is compared with the previous sum result to determine whether the data are properly received. If so, the flow advances to step S39 to register fonts downloaded in the font attribute table allocated in the work area 24a. If a check sum becomes NG, the flow advances to step S40 to erase all the downloaded data to release the assigned work area 24a to other processing operations.

In any case, in steps S39 and S40, the other input I/F which has been disabled by the above reception processing is released, and the flow returns to step S2.

A font attribute table (common in all the embodiments) is shown in FIG. 10. This table comprises the names of font scalers, and storage destination addresses of programs for realizing these font scalers. In the illustrated table, the contents of the table are updated by downloading the font scaler data. Note that "EOT" is a mark representing the end of table.

According to the second embodiment, as described above, since the font scaler data can be downloaded from the external apparatus (e.g., a host computer), the font scaler 15c can be newly registered.

Each emulation program can selectively switch between the font scalers 15a and 15b as the standard font scalers and the newly registered font scaler 15c. Therefore, more expressive outputs can be obtained.

Description of Third Embodiment

The third embodiment exemplifies downloading of a new analyzer (emulation program). The purpose of this embodiment is to easily cope with a printer language incompatible with an apparatus of the present invention without adding a new circuit to this apparatus. For the descriptive convenience, analyzers (emulation programs) 12a and 12b of the apparatus of this embodiment are standard analyzers, and a new analyzer 12c is downloaded. The analyzers 12a, 12b, and 12c are used to generate the intermediate language data described with reference to the first and second embodiments.

Figure 11:
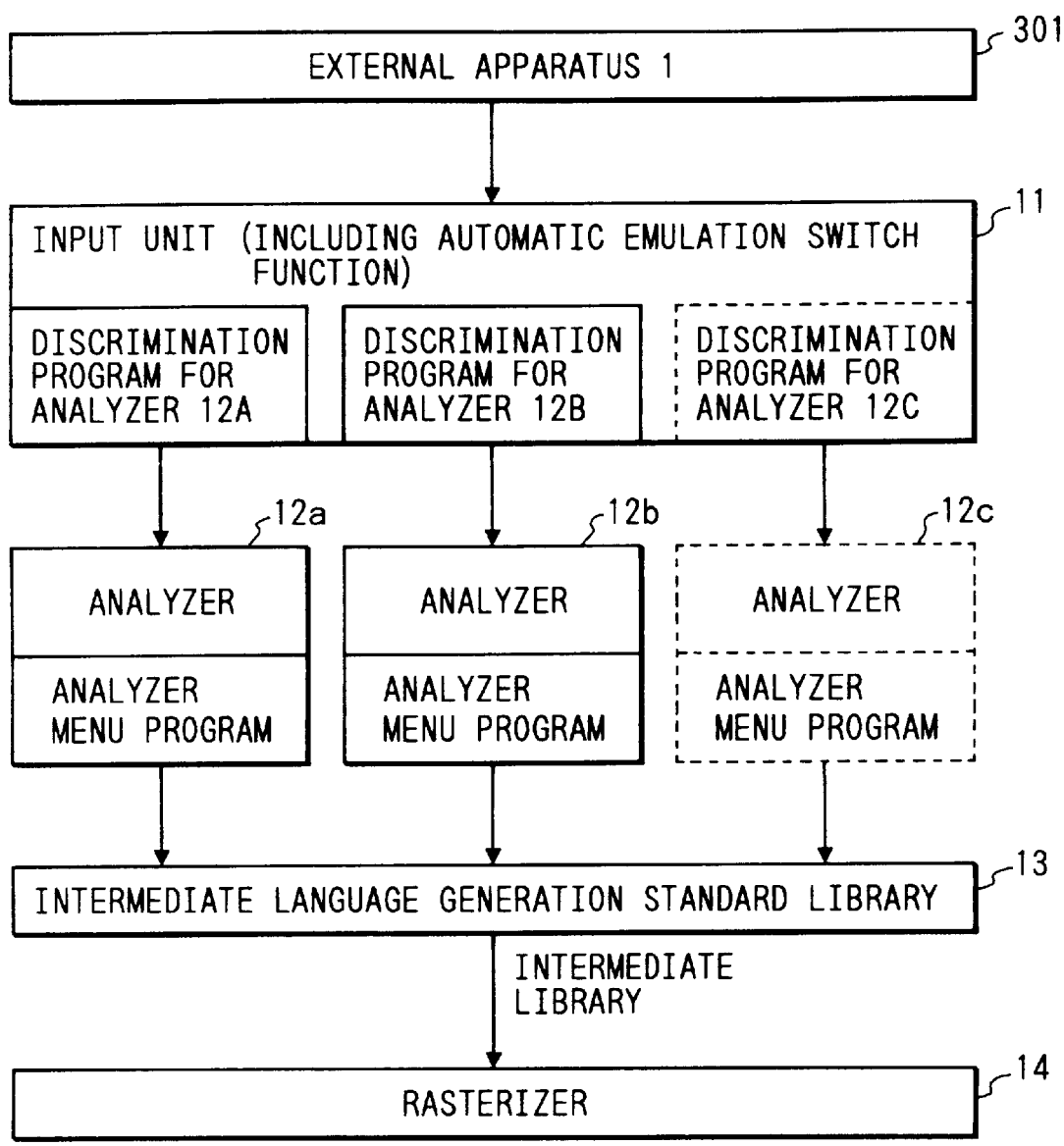
FIG. 11 is a schematic block diagram of an image processing apparatus according to the third preferred embodiment.

The schematic block diagram of the third embodiment is shown in FIG. 11.

Two emulation programs as the analyzers 12a and 12b are provided as the standard emulation programs in the apparatus, and the new third analyzer 12c is registered in the apparatus. For example, data of an emulation program downloaded from an external apparatus 301 is finally stored in a work area 24a in a RAM 24 as in the second embodiment.

Download processing of the emulation program from the external apparatus 301 is substantially the same as font scaler data downloading described in the second embodiment, and a detailed description thereof will be omitted. This downloading of the emulation program is performed in step S36 in FIG. 9.

Figure 12:
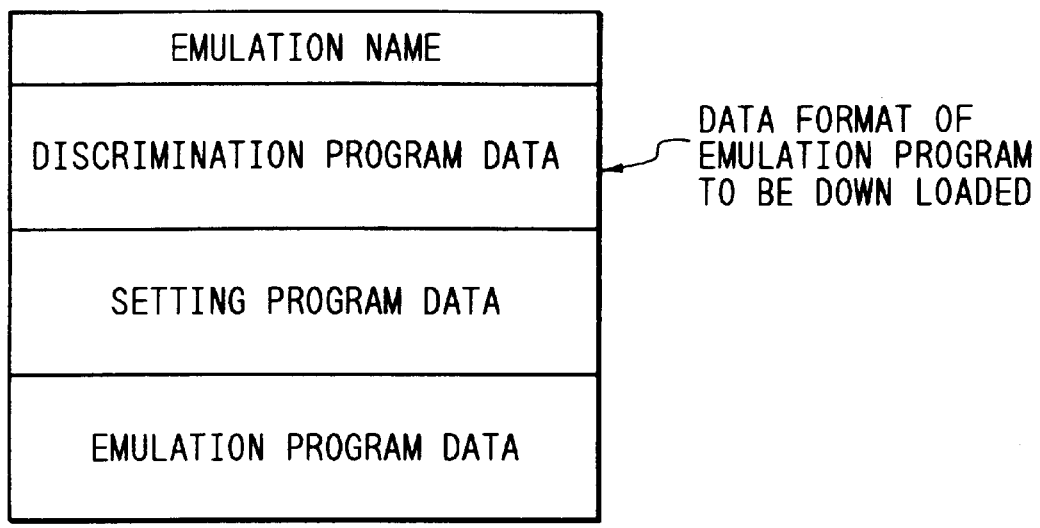
FIG. 12 is a view showing the format of emulation program data downloaded in the third embodiment.

FIG. 12 shows the contents of the emulation program data in all data sent from the external apparatus 301.

As shown in FIG. 12, an emulation name representing the correspondence between the emulation program and a specific printer language is located as the head data. Discrimination program data, setting program data, and then actual emulation program data follow the emulation name. The download command representing that the input data is download data, the code representing that the download data is emulation data, and the total number of bytes, as described with reference to the second embodiment, are located before the above data.

The discrimination program data is used in processing of step S6 in FIG. 6 in the first embodiment. The discrimination program determines whether the input data corresponds to the emulation of its own. The discrimination program includes a plurality of control commands (data format information representing a specific format of parameters) unique to the printer language to be analyzed.

The setting program data is a program for determining various setting items in use of its emulation program, and details of the setting program data will be described later.

After the data having the format shown in FIG. 12 is properly downloaded in the work area 24a in the RAM 24, a CPU 22 updates various tables of the apparatus in accordance with the downloaded data. More specifically, a discrimination program table and a management table which are arranged in the work area 24a are updated. That is, the newly downloaded emulation program is stored in these tables.

Figure 13:
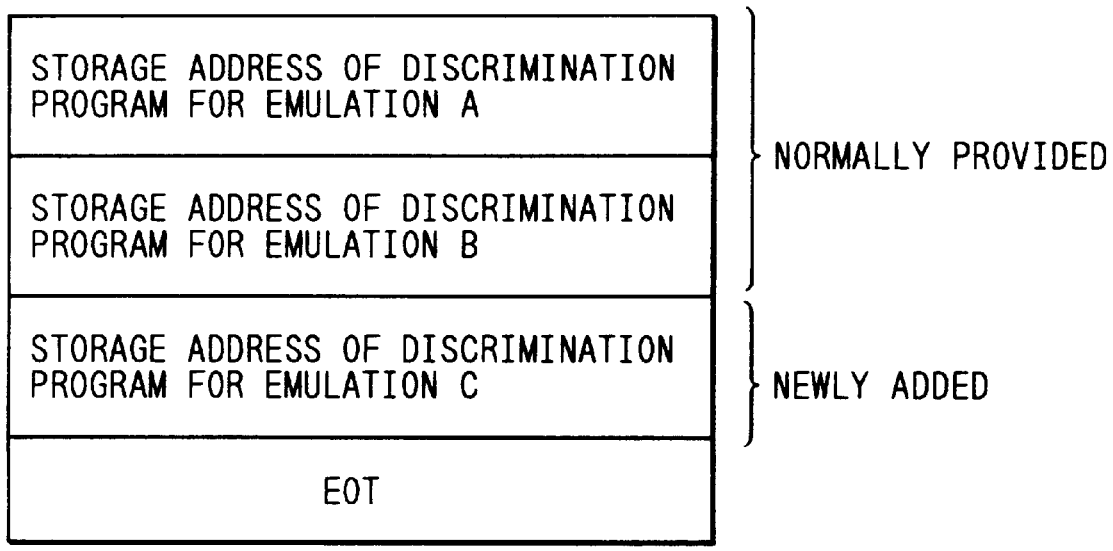
FIG. 13 is a discrimination program table common to all the illustrated embodiments.

A discrimination program table is shown in FIG. 13, and a management table is shown in FIG. 14. Note that "EOT" in each table is a mark representing the end of table data. The format of these tables is identical to that of the previous embodiments and subsequent embodiments.

The discrimination program table in FIG. 13 represents that emulation programs A and B are equipped in the apparatus from the beginning, and an emulation program C is newly registered. Automatic discrimination processing in step S6 in FIG. 6 in the first embodiment sequentially calls the discrimination programs of the analyzers which are represented by this discrimination program table and performs determination on the basis of the result of calling. For example, each discrimination program may be regarded as a program for determining whether a control command in the data stored in an input buffer area 24b is compatible with its own emulation program.

This also applies to the management table shown in FIG. 14. Items except for "emulation C" are equipped in the apparatus from the beginning.

Various printer environments are set on an operation panel 30. The environments include setting commonly used in all the emulation programs, such as interface transfer rate, and environment setting unique to each emulation program. This environment setting is finally stored in an NVRAM 31 and is kept held although the power switch is turned off.

The apparatus of this embodiment includes a plurality of input I/Fs 21a and 21b, as shown in FIG. 1 or 2. These I/Fs include a parallel interface and a serial interface such as an RS-232C interface.

Item "interface" in this management table manages these I/Fs (storage destination addresses of the I/F-associated program are stored). This program includes processing for setting a transfer rate or the like if a given input I/F is a serial interface.

Item "control" of the management table manages setting of the size and margin of recording paper stored in a paper cassette, or the like (storage destination addresses of control-associated program).

Item "memory(MEM)" manages setting of the capacity of a currently mounted memory (the memory capacity can be increased), the size of the input buffer area 24b (when this size increases, the external apparatus can be earlier released from print data output processing of its own), and the like.

Items "emulation "A, "emulation B", and "emulation C" manage programs for setting environments unique to the respective emulations and the storage destination addresses of the emulation programs. As an environment setting program, specific type and size of fonts can be selected as the defaults of, e.g., emulation A.

Item "initialization" indicates that each environment value stored in the NVRAM 31 is returned to the value at the time of factory shipment.

A downloaded emulation program is registered immediately before the item "initialization".

Of the program managed by this table, all data except for the downloaded program and data are stored in an emulation program memory 25a or 25b.

Figure 15:
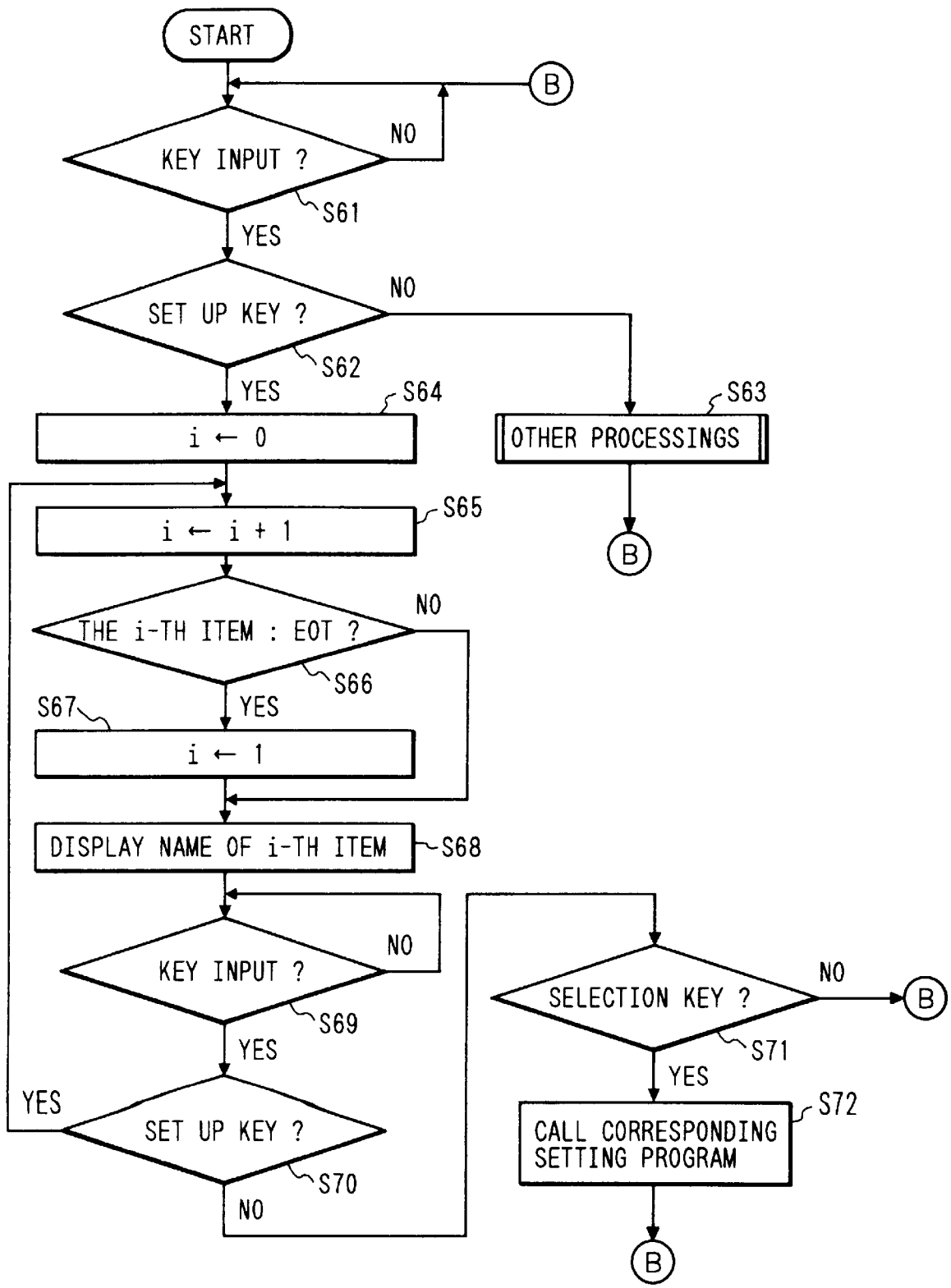
FIG. 15 is a flow chart showing the processing contents associated with an operation panel in the third embodiment.

A processing sequence of a user interface based on the management table will be described with reference to FIG. 15. A setup key and a selection key in the following description are arranged in a key group on the operation panel 30, and "i" is a pointer variable representing a management table item allocated in the work area in the RAM 24.

When the CPU 22 detects a key input in step S61, the CPU 22 determines in step S62 whether this key is a setup key. If NO in step S62, the flow advances to step S63 to perform the corresponding processing.

If YES in step S62, the flow advances to step S64 to substitute an initial value of "0" in the variable i. The variable i is incremented by one in step S65. The CPU 22 determines in step S66 whether the ith item in the management table is "EOT". If YES in step S66, the pointer variable i represents the end of table, so that the pointer variable i is updated to represent the head item in step S67.

In any case, the ith item name is displayed on the LCD display unit arranged in the operation panel 30, and the CPU 22 waits for the next key input in step S69.

If the CPU 22 determines that the input key is the setup key (step S70), the flow returns to step S65 to perform the same processing as described above, thereby displaying the next item name. Every time the setup key is depressed, the next item name is sequentially displayed on the LCD display unit.

When the user depresses the setup key several times to confirm that the desired item name is displayed, the user depresses the selection key. When the CPU 22 detects depression of the selection key (step S71), the flow advances to step S72 to call the item setting program represented by the variable i. Since each setting program depends on each item, and a description thereof will be omitted. In any case, the user proceeds the operations in accordance with the contents displayed on the LCD display unit.

According to the third embodiment described above, a desired emulation function can be appropriately added without modifying the apparatus.

A method of operating the operation panel is divided into an operation portion for setting the environment common in the entire apparatus and an operation portion for setting an environment unique to each emulation. This state can be maintained even if a new emulation is downloaded. In other words, the user can additionally learn knowledge of operations of the downloaded emulation program, and the integrated operation environment can be maintained, thereby providing a very useful user interface. From the viewpoint of the development of an emulation program, only a program for operating the corresponding emulation is prepared, thereby facilitating the development.

Since a program for discriminating whether the data is written by a printer language supported by the print data itself is contained in the downloaded emulation program data, the automatic discrimination function can be directly performed.

Description of Fourth Embodiment

In the first to third embodiments described above, any analyzer finally generates the common intermediate language data. A bit map pattern is developed in a bit map memory 28 by the common development and is then printed.

In consideration of recent electronic techniques, processing capacities (processing speeds) of external apparatuses have remarkably increased. The fourth embodiment will exemplify an arrangement in which processing for generating intermediate language data is shared by an external apparatus and printing is performed at a higher speed.

The schematic arrangement of the fourth embodiment will be described with reference to FIG. 16.

Figure 16:
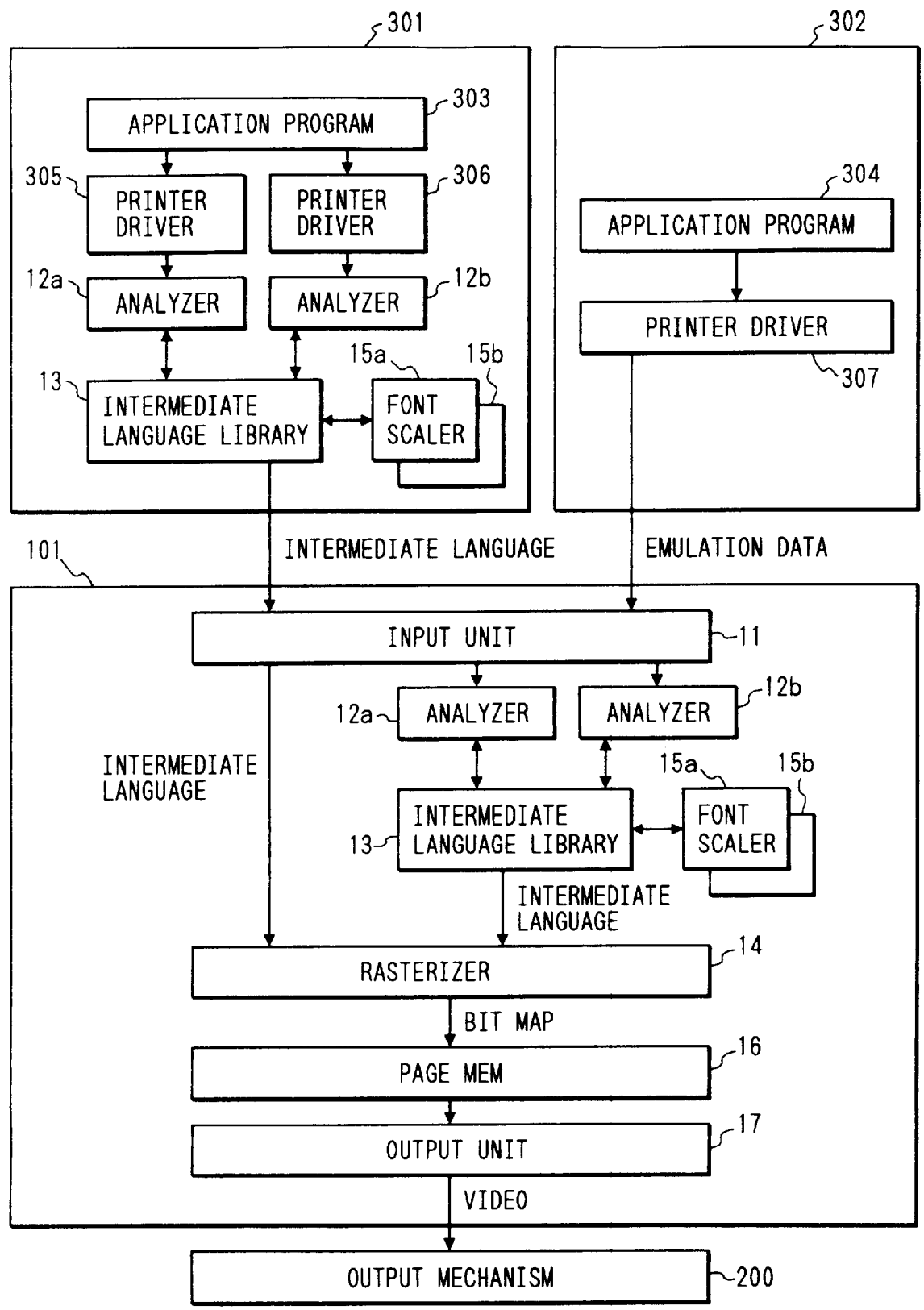
FIG. 16 is a schematic block diagram of an image processing apparatus according to the fourth preferred embodiment.

As shown in FIG. 16, in a normal external apparatus (e.g., an external apparatus 302), an application program 304 running therein outputs print data through a printer driver 307. To the contrary, an external apparatus (e.g., an external apparatus 301) as the characteristic feature of the fourth embodiment has constituent components (e.g., an intermediate language library 13, font scalers 15a and 15b, and analyzers 12a and 12b) required for generating an intermediate language. The level of the print data output from an application program 303 is lowered to the level of the intermediate language data through printer driver 305 or 306, and the intermediate language data is output to a control unit 101 in the image processing apparatus. That is, the printer language output from the application program 303 is converted into the intermediate language which can be easily interpreted by the rasterizer 14 in the image processing apparatus, and the intermediate language is output to the image processing apparatus.

FIG. 18 shows the format of the intermediate language data output from the external apparatus 301. "1000" in FIG. 18 is a numeric value representing the total number of bytes of the intermediate language data. This portion changes depending on a given condition. In this case, 1,000 bytes from "#>GS, 1000CR" to the end mark, i.e., "#>EOT" represent the intermediate language data.

Processing is performed to determine whether the data stored in an input buffer area 24b is the intermediate language data. If it is determined that the data stored in the input buffer area 24b is not data having the form of an intermediate language, processing in the first to third embodiments is performed. However, if it is determined that the data stored in the input buffer area 21b is data having the form of the intermediate language, a bit map pattern based on this intermediate language data is developed in a bit map memory (page memory 16) and is printed.

More specifically, decision step S81 in FIG. 17 is inserted immediately before step S6 in FIG. 6 (or immediately before step S31 in FIG. 9) to realize the above processing.

In bit map development performed after the input data is determined to be data in the form of the intermediate language and the flow advances to step S10, the intermediate language data is processed such that it is stored not in an intermediate language area 24c, but in the input buffer area 24b.

According to the fourth embodiment, as described above, the image processing apparatus itself is operated to directly input intermediate language data. The image processing apparatus is free from processing for generating intermediate language data described as in the first to third embodiments, thereby increasing the print speed. In addition, when a new emulation program is to be downloaded, a memory may be extended. According to the fourth embodiment, however, such memory extension need not be taken into consideration, thereby providing an apparatus having a large number of emulation functions at low cost.

Description of Fifth Embodiment

External apparatuses output various printer languages, as previously described. Some printer languages are suitable for sentences; some, for figures; and some, for images.

The fifth embodiment exemplifies an arrangement in which an image based on a plurality of printer languages, i.e., a plurality of emulations, is printed on one page.

Figure 19:
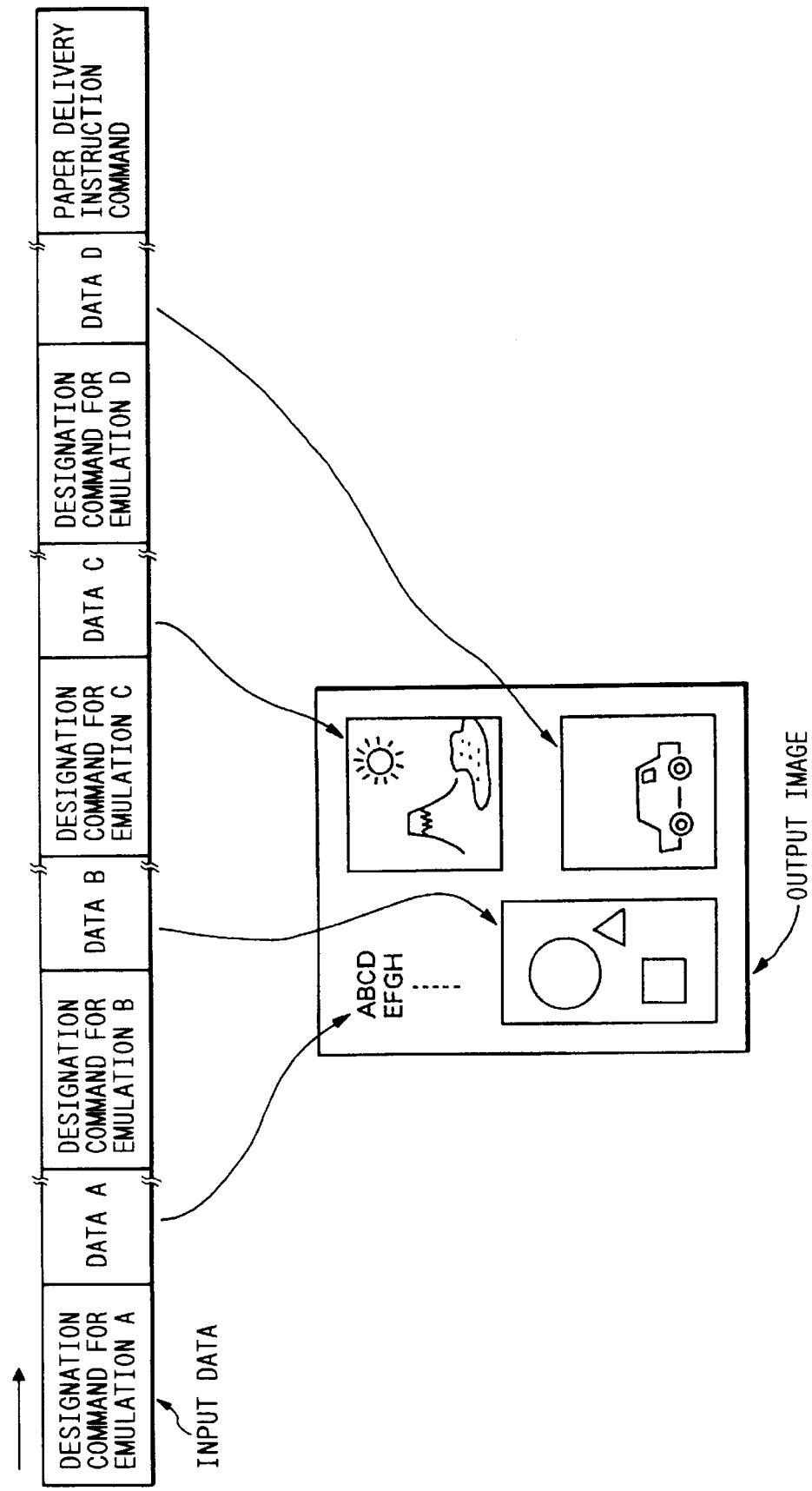
FIG. 19 is a view showing the relationship between input data and an output image in the fifth preferred embodiment.

To realize this, an external apparatus sends data constituted by a pair of actual print data and an emulation designation command representing the type of emulation data and a data length (size), and finally a paper delivery instruction command for printing information on the paper and delivering the paper is added to the end of sent data, as shown in FIG. 19.

In the illustrated case, emulation data A is print language data suitable for printing a text; emulation data B, for printing a figure; emulation data C, for printing a dot image; and emulation data D, for printing a figure.

The detailed format of the input data is shown in FIG. 20.

As shown in FIG. 20, the emulation designation command consists of a name of emulation starting with "#>", a comma, a size, and a new line code. The paper delivery instruction command is "#>EOT".

Figure 21:
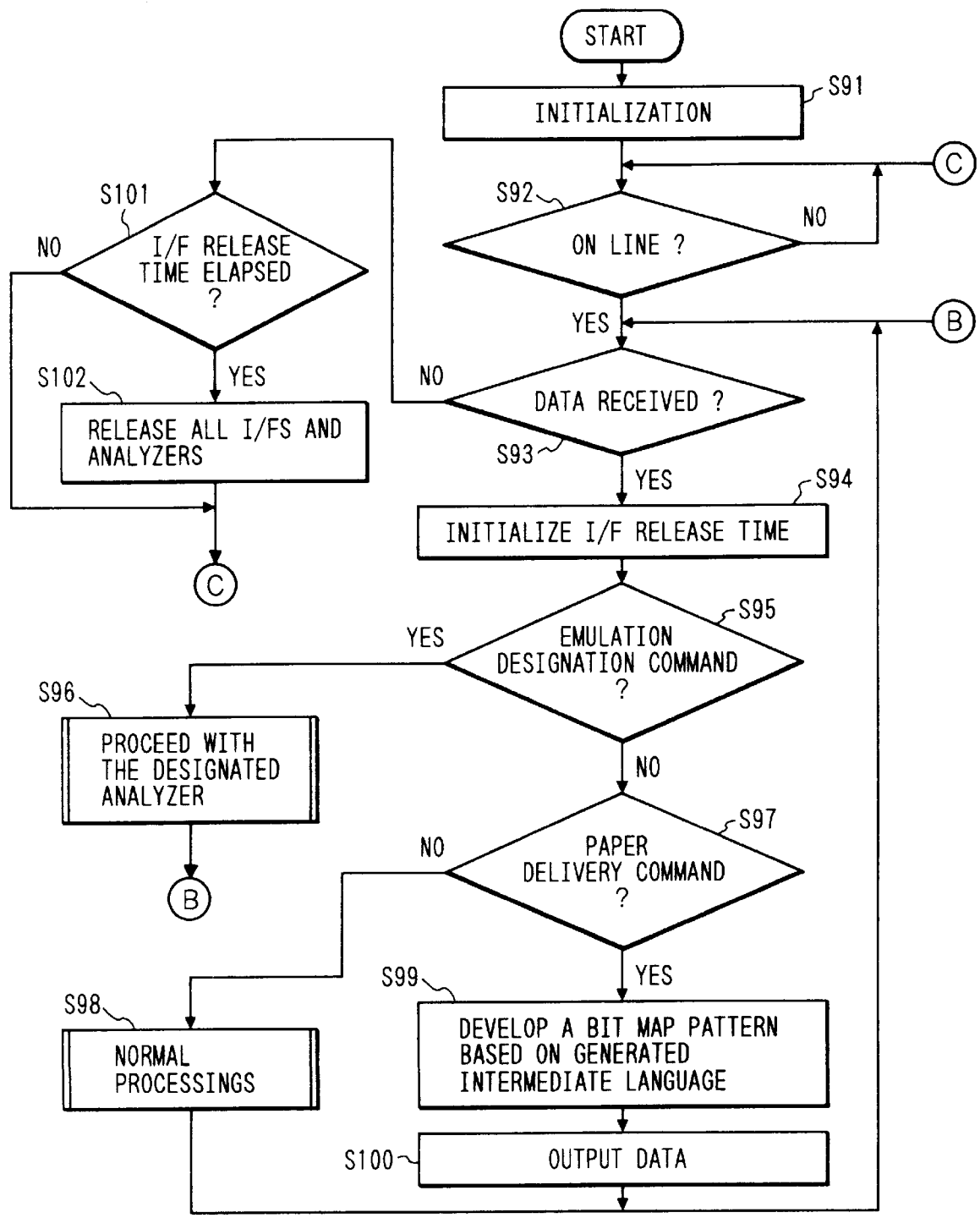
FIG. 21 is a flow chart showing a main routine in the fifth embodiment.

A processing sequence of the apparatus having the above data format is shown in FIG. 21 and will be described below.

When the power switch of the apparatus is turned on, initialization is started as in the first embodiment. A step of determining whether the on-line state is set, I/F release time resetting upon detection of data in the input buffer area 24b, and processing in the absence of the data in the input buffer area are the same as those in the first embodiment. Operations from step S95 will be described below.

In step S95, the head portion of the non-processed data stored in the input buffer area 24b is checked to determine whether it is an emulation designation command. If YES in step S95, the flow advances to step S96 to cause the designated emulation program (analyzer) to generate intermediate language data in a designated size. When this processing is completed, the flow returns to step S93 to process the next data. In this manner, the intermediate language data designated by the emulation designation command is generated.

If it is determined that the head portion of the input data at the start of one print cycle or data following the input data used by one analyzer to generate intermediate language data is not an emulation designation command, the flow advances to step S97. The CPU 22 determines whether this data is a paper delivery instruction command. If NO in step S97, the flow advances to step S98 to perform the same operations as in the first to fourth embodiments described above.

If the input data is determined to be a paper delivery instruction command, a pattern based on all the intermediate language data generated in the intermediate language area 24c is developed in the bit map memory 28. The developed data is output in step S100.

In the above processing, after one-page intermediate language data is generated by each analyzer (emulation program), it is developed into a bit map pattern. However, every time intermediate language data is generated by each analyzer, pattern development may be performed. In this case, development processing is performed immediately after step S96.

This does not apply to a case wherein pattern development is performed simultaneously with intermediate language data generation. When each analyzer (emulation program) is called from the main routine, intermediate language data may be generated by the designated number of bytes, and a detailed description thereof will be omitted.

According to the fifth embodiment, as described above, since an image based on a plurality of printer languages can be formed on one page, an impressive image can be obtained.

When a high-level instruction or designation command is sent, as in the fifth embodiment, such a function may be added to an OS operated in the external apparatus or a printer driver of the apparatus of this embodiment. In some cases, printer languages may be designated for the created sentences, figures, and images in accordance with an application program running in the external apparatus. In addition, an OS is operated in a cut-and-paste form to synthesize partial data designated by an application program for forming a sentence, an application program for forming a figure, and an application program for editing an image read from a scanner or the like. When the synthesized image is to be output, the data may be constructed and output using the format of the fifth embodiment.

In the first to fifth embodiments, each of the numbers of external apparatuses (301 and 302), the corresponding input interfaces (21a and 21b), and the font scalers (15a and 15b) is not limited to two, but can be three or more. Each of the numbers of newly registered analyzers 12c and font scalers 15c need not be limited to one, but can be two or more.

The present invention may be applied to a system constituted by a plurality of devices or an apparatus constituted by one device. In addition, the present invention can be achieved by supplying a program to the system or apparatus.

The image processing apparatus of each embodiment described above exemplifies a laser beam printer. However, the present invention is not limited to this. The present invention is equally applicable to an ink-jet printer to be described later.

(i) General Description of Apparatus Main Body

Figure 24:
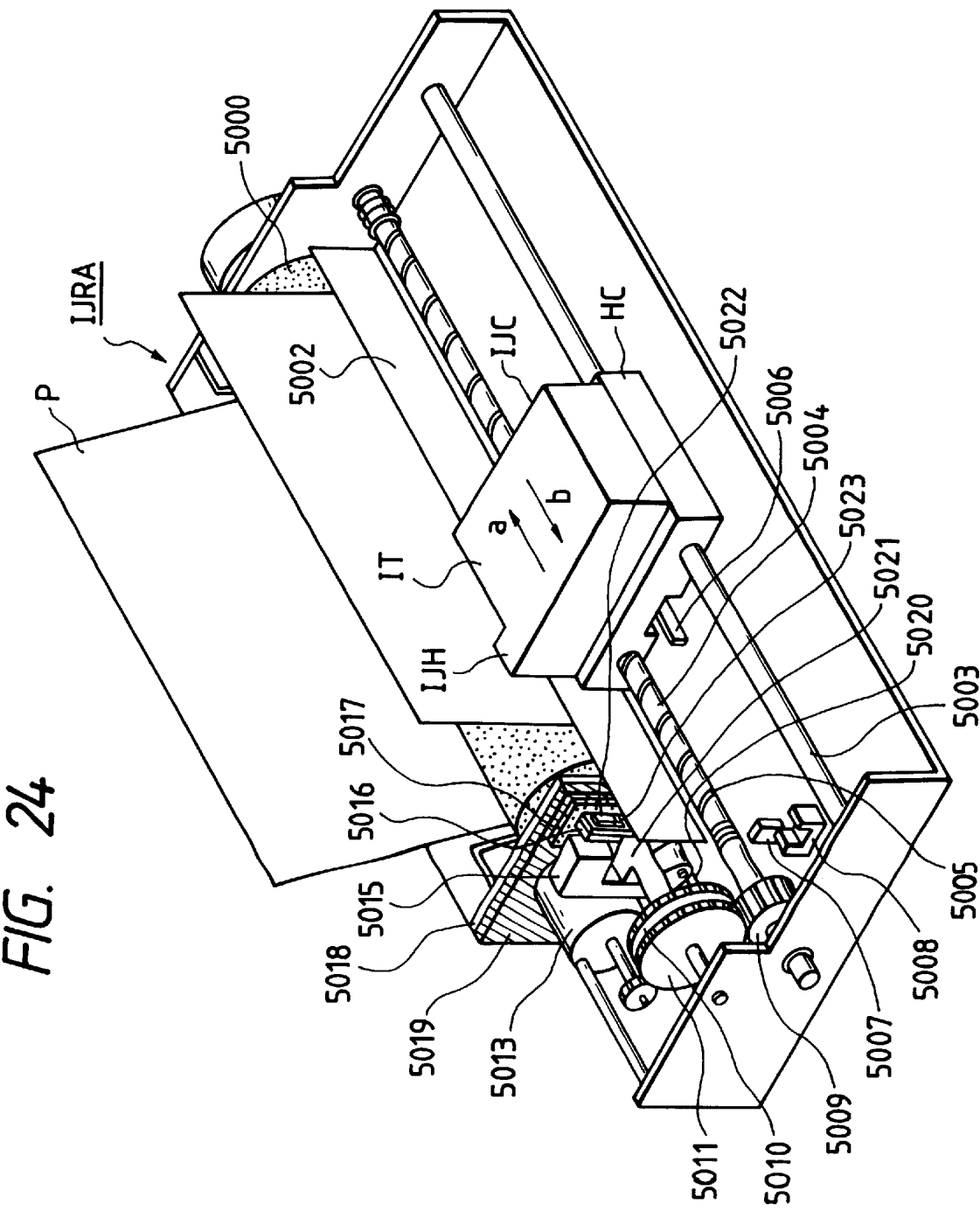
FIG. 24 is a perspective view showing the internal structure of an ink-jet printer to which the present invention can be applied.

FIG. 24 is a perspective view of an ink-jet recording apparatus IJRA to which the present invention can be applied. Referring to FIG. 24, a carriage HC engaged with a helical groove 5004 of a lead screw 5005 rotated interlockingly with normal/reverse rotation of a drive motor 5013 through driving force transmission gears 5011 and 5009 has a pin (not shown) and can be reciprocated in directions indicated by arrows a and b. An ink-jet cartridge IJC is mounted on the carriage HC. A paper press plate 5002 presses the paper in the carriage movement direction through a platen 5000. Photocouplers 5007 and 5008 are home position detecting means for detecting the presence of a lever 5006 of the carriage within this range to switch the rotational direction of the motor 5013. A member 5016 supports a cam member 5022 for capping the front surface of a recording head. A suction means 5015 draws the ink from the cap to recover the recording head through an opening 5023 in the cap. A cleaning blade 5017 is moved back and forth by a member 5019, and the cleaning blade 5017 and the member 5019 are supported on a main body support plate 5018. The blade need not have this form, but can be replaced with a known cleaning blade. A lever 5012 starts suction to recover the recording head. The lever 5012 is moved together with movement of a cam 5020 engaged with the carriage. The driving force from the driving motor is controlled by a known transmitting means such as clutch switching.

Capping, cleaning, and suction recovery are performed by desired processes at the corresponding positions in accordance with the behavior of the lead screw 5005 when the carriage reaches the home position. If desired operations are performed at known timings, any scheme can be employed in this embodiment.

(ii) Description of Control Arrangement

Figure 25:
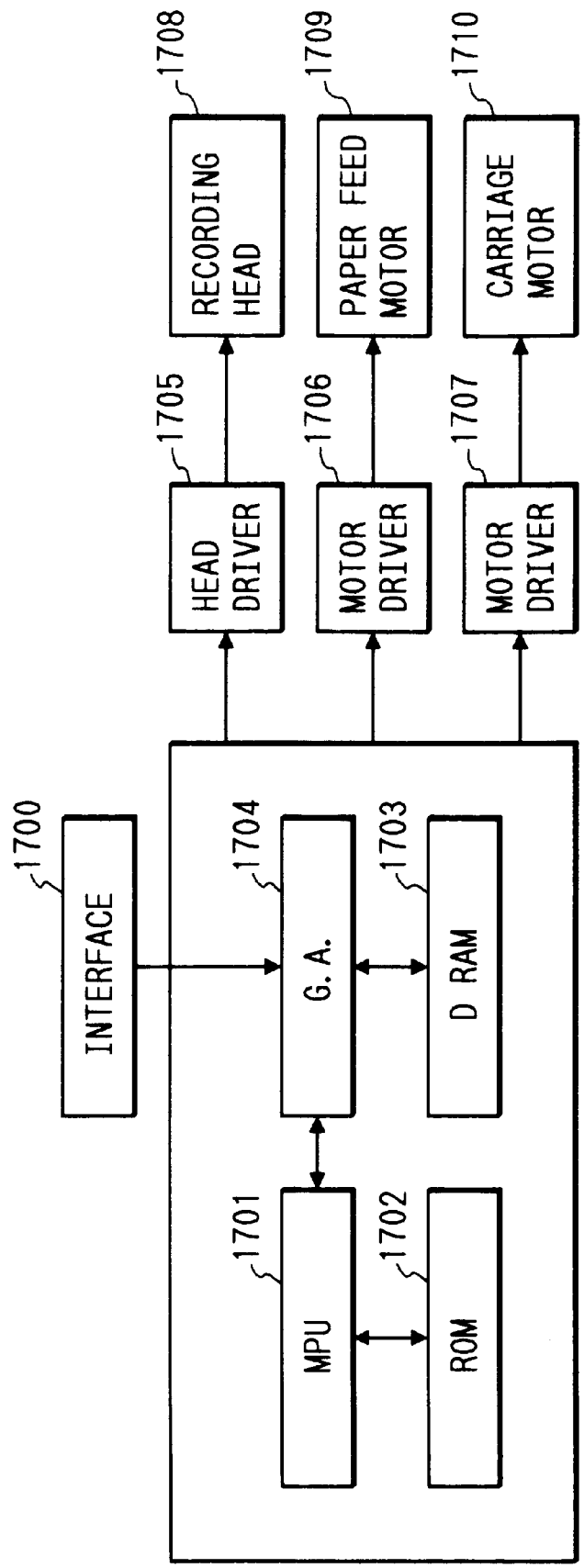
FIG. 25 is a block diagram of a control circuit of the ink-jet printer shown in FIG. 24.

A control arrangement for executing recording control of the respective components in the apparatus will be described with reference to the block diagram in FIG. 25. A control circuit includes an interface 1700 for inputting a recording signal, an MPU 1701, a program ROM 1702 for storing control programs executed by the MPU 1701, a dynamic RAM 1703 for storing various data (e.g., the recording signal and recording data supplied to the head), a gate array 1704 for controlling and supplying the recording data to a recording head 1708 and performing transfer control of data between the interface 1700, the MPU 1701, and the RAM 1703, a carrier motor 1710 for feeding the recording head 1708, a convey motor 1709 for conveying a recording sheet, a head driver 1705 for driving the head, and motor drivers 1706 and 1707 for driving the convey motor 1709 and the carrier motor 1710, respectively.

The operation of the above control arrangement will be described below. When a recording signal is input to the interface 1700, a recording signal is converted into print recording data between the gate array 1704 and the MPU 1701. The motor drivers 1706 and 1707 are driven to drive the recording head in accordance with the recording data supplied to the head driver 1705, thereby printing the recording information.

It is possible to incorporate the constituent components of the present invention in the control arrangement of the ink-jet printer. The present invention is apparently applicable to the ink-jet printer in addition to the laser beam printer.

What is claimed is:

1. An image processing apparatus comprising:

first generation means for generating first data expressed in an intermediate language from a first input command expressed in a first printer language;

second generating means for generating second data expressed in the intermediate language from a second input command expressed in a second printer language;

storage means for storing information regarding various functions to cause said first and second generation means to generate the first and second data from the first and second input commands, respectively; and development means for developing either one of the first and second data generated by said first and second generation means, respectively, into bit map image data.

2. An apparatus according to claim 1, wherein said apparatus comprises an ink jet printer.

3. An apparatus according to claim 1, wherein said apparatus comprises a laser beam printer.

4. An apparatus according to claim 1, wherein said apparatus comprises a host computer.

5. An apparatus according to claim 1, further comprising:

determining means for determining whether a third input command is expressed in the intermediate language; and control means for controlling said developing means to develop the third input command into bit map image data when said determining means determines that the third input command is expressed in the intermediate language.

6. An apparatus according to claim 5, further comprising:

first storage means for storing information as to various functions used by said first conversion means to convert the first command into the first data; and second storage means for storing information as to various functions used by said second conversion means to convert the second command into the second data.

7. An apparatus according to claim 5, wherein said apparatus comprises an ink jet printer.

8. An apparatus according to claim 5, wherein said apparatus comprises a laser beam printer.

9. A method carried out in an image processing apparatus comprising:

a first step of generating first data expressed in an intermediate language from a first input command expressed in a first printer language;

a second step of generating second data expressed in the intermediate language from a second input command expressed in a second printer language;

storing information regarding various functions to cause said first and second steps to generate the first and second data from the first and second input commands, respectively; and developing either one of the first and second data generated by said first and second steps, respectively, into bit map image data.

10. A method according to claim 9, further comprising the steps of:

storing information as to various functions used by said first conversion step to convert the first command into the first data; and storing information as to various functions used by said second conversion step to convert the second command into the second data.

11. A method according to claim 9, wherein the image processing apparatus comprises an ink jet printer.

12. A method according to claim 9, wherein the image processing apparatus comprises a laser beam printer.

13. A method according to claim 9, wherein the image processing apparatus comprises a host computer.

14. A method according to claim 9, further comprising the step of developing the first and second data into the bit map image data.

15. A method according to claim 14, further comprising the steps of:

storing information as to various functions used by said first conversion step to convert the first command into the first data; and storing information as to various functions used by said second conversion step to convert the second command into the second data.

16. A method according to claim 14, wherein the image processing apparatus comprises an ink jet printer.

17. A method according to claim 14, wherein the image processing apparatus comprises a laser beam printer.

18. A method according to claim 14, further comprising the steps of:

determining whether a third input command is expressed in the intermediate language; and controlling said developing step to develop the third input command into bit map image data when said determining step determines that the third input command is expressed in the intermediate language.

19. A method according to claim 18, further comprising the steps of:

storing information as to various functions used by said first conversion step to convert the first command into the first data; and storing information as to various functions used by said second conversion step to convert the second command into the second data.

20. A method according to claim 18, wherein the image processing apparatus comprises an ink jet printer.

21. A method according to claim 18, wherein the image processing apparatus comprises a laser beam printer.

22. A memory medium for storing a program executed in an image processing apparatus, with the program comprising:

a first step of generating first data expressed in an intermediate language from a first input command expressed in a first printer language;

a second step of generating second data expressed in the intermediate language from a second input command expressed in a second printer language storing information regarding various functions to cause said first and second steps to generate the first and second data from the first and second input commands, respectively; and developing either one of the first and second data generated by said first and second steps, respectively, into bit map image data.

23. A memory medium according to claim 22, wherein the program further comprises the steps of:

storing information as to various functions used by said first conversion step to convert the first command into the first data; and storing information as to various functions used by said second conversion step to convert the second command into the second data.

24. A memory medium according to claim 22, wherein the image processing apparatus comprises an ink jet printer.

25. A memory medium according to claim 22, wherein the image processing apparatus comprises a laser beam printer.

26. A memory medium according to claim 22, wherein the image processing apparatus comprises a host computer.

27. A memory medium according to claim 22, wherein the program further comprises the step of developing the first and second data into the bit map image data.

28. A memory medium according to claim 27, wherein the program further comprises the steps of:

storing information as to various functions used by said first conversion step to convert the first command into the first data; and storing information as to various functions used by said second conversion step to convert the second command into the second data.

29. A memory medium according to claim 27, wherein the image processing apparatus comprises an ink jet printer.

30. A memory medium according to claim 27, wherein the image processing apparatus comprises a laser beam printer.

31. A memory medium according to claim 27, wherein the program further comprises the steps of:

determining whether a third input command is expressed in the intermediate language; and controlling said developing step to develop the third input command into bit map image data when said determining step determines that the third input command is expressed in the intermediate language.

32. A memory medium according to claim 31, wherein the program further comprises the steps of:

storing information as to various functions to cause said first conversion step to convert the first command into the first data; and storing information as to various functions to cause said second conversion step to convert the second command into the second data.

33. A memory medium according to claim 31, wherein the image processing apparatus comprises an ink jet printer.

34. A memory medium according to claim 31, wherein the image processing apparatus comprises a laser beam printer.

* * * * *